(12) United States Patent
Okamoto et al.

(10) Patent No.: US 6,898,345 B2
(45) Date of Patent: May 24, 2005

(54) OPTICAL MULTIPLEXER AND METHOD FOR ITS PRODUCTION

(75) Inventors: Katsunari Okamoto, Tokyo (JP); Akimasa Kaneko, Tokyo (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 10/334,432

(22) Filed: Dec. 30, 2002

(65) Prior Publication Data

US 2003/0185512 A1 Oct. 2, 2003

(30) Foreign Application Priority Data

Apr. 2, 2002 (JP) ........................................ 2002-027141

(51) Int. Cl.$^7$ ................................................ G02B 6/28
(52) U.S. Cl. ............................................ 385/24; 385/37
(58) Field of Search .................... 385/24, 14, 129–231, 385/43, 37

(56) References Cited

U.S. PATENT DOCUMENTS

| | | | |
|---|---|---|---|
| 5,467,418 A | | 11/1995 | Dragone |
| 5,546,483 A | * | 8/1996 | Inoue et al. ................... 385/14 |
| 5,841,919 A | * | 11/1998 | Akiba et al. ................... 385/37 |
| 6,049,640 A | * | 4/2000 | Doerr ............................ 385/15 |
| 6,195,482 B1 | | 2/2001 | Dragone |
| 6,212,315 B1 | * | 4/2001 | Doerr ............................ 385/31 |
| 6,282,361 B1 | * | 8/2001 | Nishimura et al. .......... 385/140 |
| 6,389,201 B1 | * | 5/2002 | Urino ............................ 385/43 |
| 6,424,420 B1 | * | 7/2002 | Nakaya ........................ 356/477 |
| 6,490,395 B1 | * | 12/2002 | Nara et al. ..................... 385/39 |
| 6,549,696 B1 | * | 4/2003 | Uetsuka et al. ................ 385/24 |
| 6,563,988 B2 | * | 5/2003 | McGreer ....................... 385/43 |
| 6,574,397 B2 | * | 6/2003 | Katayama et al. ............ 385/46 |
| 2002/0001433 A1 | * | 1/2002 | Hosoi ............................ 385/37 |
| 2002/0076145 A1 | * | 6/2002 | Lam et al. ..................... 385/24 |
| 2003/0176665 A1 | | 9/2003 | Missey et al. |

FOREIGN PATENT DOCUMENTS

JP     11-142661     5/1999

OTHER PUBLICATIONS

EP Search Report.
Melissa Dixon, "Performance Improvements in Arrayed Waveguide–Grating Modules" The International Society for Optical Engineering, 2002, SPIE–Int. Soc. Opt. Eng, USA vol. 4640 Jan. 21, 2002 pp. 79–92.
Hiroaki Yamada, et al " Dispersion Resulting From Phase And Amplitude Errors In Arrayed–Waveguide Grating Multiplexers– Demultiplexers" Opt. Lett. Optics Letters, Opt. Soc. America, USA, vol. 25, No. 8, Apr. 15, 2000.
K. Takada, Y. Inoue, Yamada and M. Horiguchi, "Measurement of phase error distributions in silica–based arrayed-waveguide grating multiplexers by using Fourier transform spectroscopy", Electronic Letters, vol. 30,pp. 167–1672, 1994.

* cited by examiner

Primary Examiner—Michael G. Lee
Assistant Examiner—Uyen-Chau N. Le
(74) Attorney, Agent, or Firm—Hedman & Costigan, P.C.

(57) ABSTRACT

An optical multiplexer is equipped with at least one input channel optical waveguide provided on an optical waveguide substrate, a first slab optical waveguide, a channel optical waveguide array formed from a plurality of optical waveguides having a prescribed waveguide length, a second slab optical waveguide and at least one output channel optical waveguide sequentially connected in a tandem arrangement; and phase adjustment to achieve the same phase distribution in the channel optical waveguide array.

23 Claims, 38 Drawing Sheets

(a) First Slab Optical Waveguide (b) Second Slab Optical Waveguide

OPTICAL MULTIPLEXER AND METHOD FOR ITS PRODUCTION

BACKGROUND OF THE INVENTION

Field of the Invention

The present invention is related to an optical multiplexer which carries out multiplexing and demultiplexing of optical signals in wavelength division multiplexing (WDM) optical communication and the like.

Description of the Prior Art

The structure of a WDM optical communication system is shown in FIG. 1. As shown in FIG. 1, this system includes an optical transmitter 1, optical transmission circuits 2, an optical multiplexer 3, an optical communication path 4, an optical receiver 5, an optical demultiplexer 6, and optical reception circuits 7. In the example shown in FIG. 1, optical signals $\lambda 1 \sim \lambda n$ having different wavelengths are outputted from respective optical transmission circuits 2 in the optical transmitter 1, and after being multiplexed by the optical multiplexer 3, such optical signals are transmitted to the optical communication path 4. In the optical receiver 5, the optical signals $\lambda 1 \sim \lambda n$ from the optical communication path 4 are received by respective optical reception circuits 7 after being demultiplexed by the optical demultiplexer 6.

The arrayed waveguide grating (AWG) shown in FIG. 2 is a known prior art optical multiplexer used in WDM optical communication systems. In the AWG of FIG. 2, an input channel optical waveguide 31 for inputting wavelength division multiplexed optical signals, a first slab optical waveguide 32 for horizontally expanding the input light, a channel optical waveguide array 33 constructed from a plurality of optical waveguides having prescribed different lengths, a second slab optical waveguide 34 for creating interference with the light of the arrayed optical waveguides, and an output channel optical waveguide 35 for outputting demultiplexed optical signals are formed on an optical waveguide substrate 30.

In this kind of AWG, in order to obtain a flat demultiplexing spectrum like that shown in FIG. 7 for the pass band, there is a known method of carrying out adjustments so that the electric field amplitude and the electric field phase distribution in the boundary of the channel optical waveguide array 33 and the second slab optical waveguide 34 of FIG. 2 form the amplitude and phase of a sinc function. The sinc function is given below:

$$\mathrm{sinc}\ \xi = (\sin\ \xi)/\xi$$

In the case where $\xi = \pi(m-149)/60$ (for a channel optical waveguide array of 298 optical waveguides), then for the array optical waveguide number m, FIG. 3 shows the electric field amplitude $\alpha(m)$, FIG. 4 shows the electric field phase $\theta(m)/\pi$, and FIG. 5 shows the electric field distribution. The absolute value of the electric field distribution of FIG. 5 forms the electric field amplitude of FIG. 3, and the positive range and negative range of the electric field distribution of FIG. 5 respectively form the 0 phase and $\pi$ phase of FIG. 4. When the electric field amplitude and the electric field phase or the electric field distribution in the boundary of the channel optical waveguide array 33 and the second slab optical waveguide 34 of FIG. 2 are established like that shown in FIG. 3~FIG. 5, the optical distribution in the boundary of the second slab optical waveguide 34 and the output channel optical waveguide 35 in FIG. 2 forms a roughly rectangular distribution as shown by the broken line of FIG. 6. The demultiplexing spectral characteristics of the AWG are given by an overlapping integral of the optical distribution of the broken line of FIG. 6 and the eigen-mode distribution of the output channel optical waveguide 35 of the solid line of FIG. 6. Because the optical distribution is roughly rectangular, the demultiplexing spectral characteristics of the AWG has a roughly flat pass band like that shown in FIG. 7.

As for a method of making the electric field distribution in the boundary of the channel optical waveguide array 33 and the second slab optical waveguide 34 form a sinc function state, there is a known method of using a parabolic optical waveguide like that shown in FIG. 8 for the shape of the input channel optical waveguide 31 at the boundary with the first slab optical waveguide 32. When the parabolic shape and length of the input channel optical waveguide 31 are set at appropriate values, it is possible to obtain a roughly rectangular optical distribution like that shown in FIG. 8. When the rectangular optical distribution of FIG. 8 passes through the first slab optical waveguide 32 and is incident on the channel optical waveguide array 33, the electric field distribution of the channel optical waveguide array 33 forms a sinc function state distribution by a spatial Fourier transform relationship, and a roughly rectangular optical distribution like that shown in FIG. 9 is formed again at the boundary of the second slab optical waveguide 34 and the output channel optical waveguide 35. As a result, a pass band having flat demultiplexing spectral characteristics is obtained in the manner described above.

In this kind of flat-type AWG, there is the problem that it is difficult to obtain flat characteristics when the parabolic shape of the optical waveguide is shifted from the established value, and in order to solve this problem, an example (JP, 11-142661, A) has been proposed in which specific optical waveguides of the arrayed optical waveguides are removed and the luminous intensity distribution is compensated to make the luminous intensity distribution formed on the channel optical waveguide array approach a sinc function state. As for the compensation described above, instead of directly compensating the shift from the established value of the parabolic portion, the far-field thereof and the equivalent luminous intensity distribution in the channel optical waveguide array is compensated to approach a sinc function state, and in this way the distribution spectrum of the AWG is improved to a rectangular state. However, in this kind of prior art flat-type AWG, there is the problem that the AWG itself has a large dispersion, and this problem could not be solved by the prior art compensation method of making the luminous intensity distribution approach a sinc function state.

FIG. 10 shows an example of the dispersion characteristics of a flat-type AWG having a 0.8 nm channel space and a parabolic input channel optical waveguide. The horizontal axis is the relative wavelength from the central channel wavelength. The dispersion value is approximately $\sigma = -20$ ps/nm. FIG. 11 shows the results of calculating the pulse waveform distortion generated in the case where a light pulse having a bit rate B=40 Gbps is incident on an AWG having a dispersion of $\sigma = -20$ ps/nm. In the case where the AWG itself has a dispersion of $|\sigma| = 20$ ps/nm, the waveform distortion of the signal is very large, and this is known to increase the error rate of the transmission signal. As is clear from FIG. 11, in the prior art flat-type AWG, the pulse waveform is distorted due to the dispersion in the AWG itself, and this forms a serious problem that makes it impossible to use the AWG as a multiplexer.

SUMMARY OF THE INVENTION

In order to solve the problems of the prior art described above, it is an object of the present invention to reduce the dispersion of the AWG itself, and provide an optical multiplexer which can be suitably used for WDM optical communication.

DETAILED DESCRIPTION OF THE PREFERRED EMBODIMENTS

The preferred embodiments of the present invention are described below with reference to the drawings.

Embodiment 1

Figure 12:
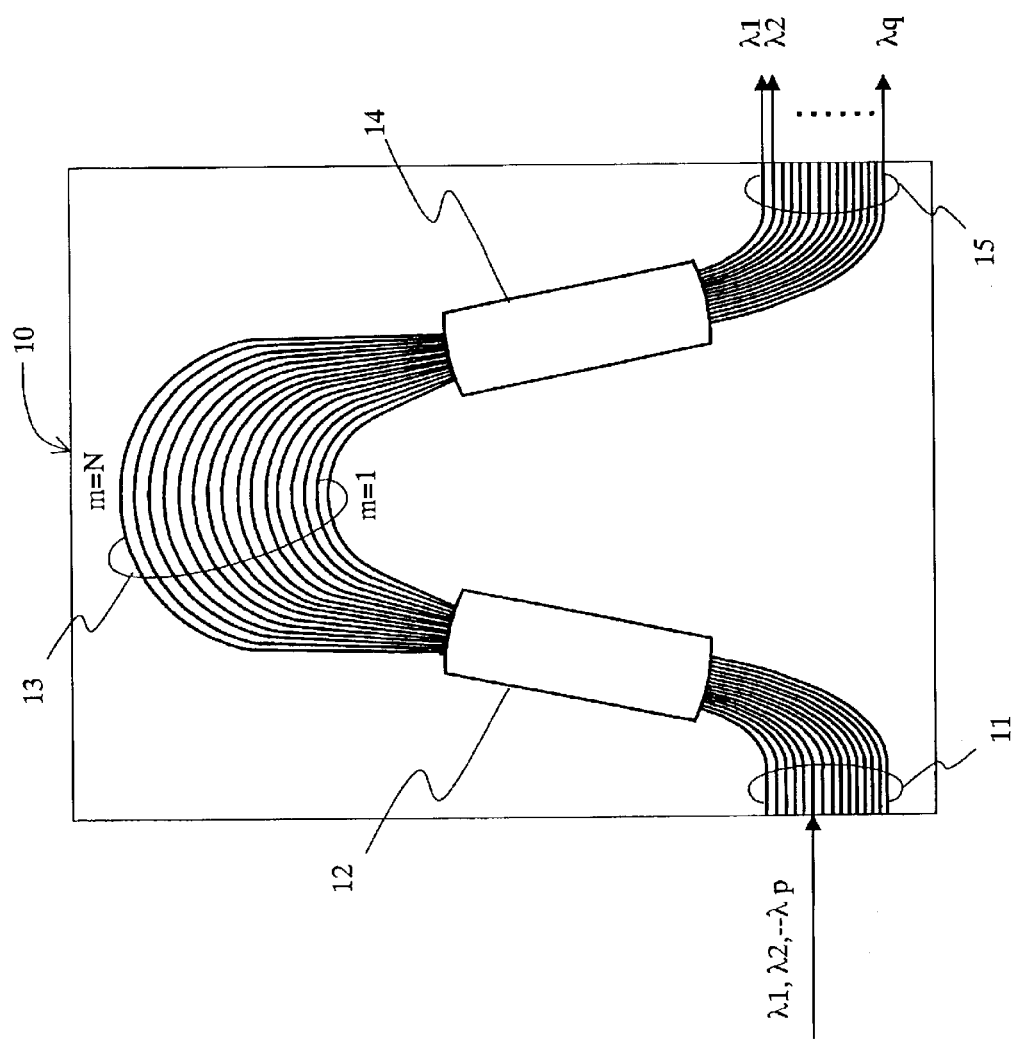
FIG. 12 is a structural drawing of an embodiment of an AWG of the present invention.

FIG. 12 shows the first embodiment of the present invention. Namely, FIG. 12 shows an optical multiplexer constructed from an input channel optical waveguide 11, a first slab optical waveguide 12 for expanding the input light in a direction parallel with respect to the optical waveguide, a channel optical waveguide array 13 constructed from a plurality of optical waveguides in which each m'th optical waveguide has a length $m\Delta M + \delta(m)$ with respect to the inside (m−1)'th optical waveguide, a second slab optical waveguide 14 for creating interference with the light of the arrayed optical waveguides, and an output channel optical waveguide 15 which are sequentially connected in tandem on an optical waveguide substrate. The term $\delta(m)$ is the adjustment value of the waveguide length determined by a method described later. Further, the waveguide length of adjacent arrayed optical waveguides of the channel optical waveguide array 13 is $\Delta M = 31$ μm, the number of optical waveguides of the channel optical waveguide array 13 is N=290, the number of channels of the multiplexer is $N_{ch}$=64, the channel space of the multiplexer is S=100 GHz, and the central channel wavelength is $\lambda_{center}$=1.55 μm.

Figure 13:
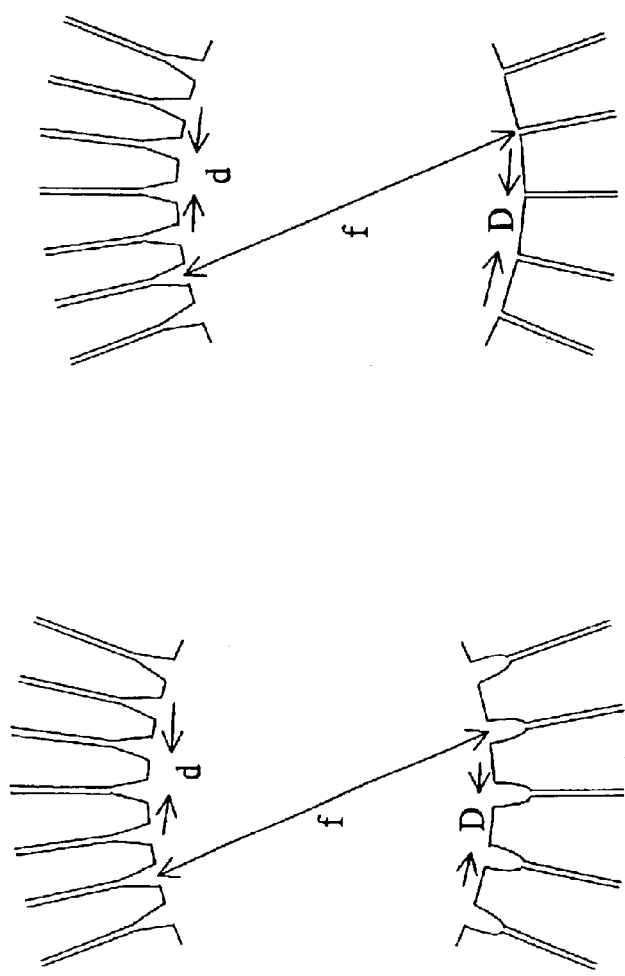
FIG. 13 is a drawing showing the slab optical waveguide of an embodiment of an AWG of the present invention.

FIGS. 13(a) and 13(b) respectively show enlarged views of the first slab optical waveguide 12 and the second slab optical waveguide 14. In the first slab optical waveguide 12 shown in FIG. 13(a) or the second slab optical waveguide 14 shown in FIG. 13(b), the waveguide space of the input channel optical waveguide 11 and the output channel optical waveguide 15 is D=25 μm, the waveguide space of the channel optical waveguide array 13 is d=20 μm, the radius of curvature of the first slab optical waveguide 12 and the second slab optical waveguide 14 is f=30.76 mm, the length of the parabolic input optical waveguide is l=400 μm, and the width of the tip of the parabolic input is w=23 μm.

Figure 8:
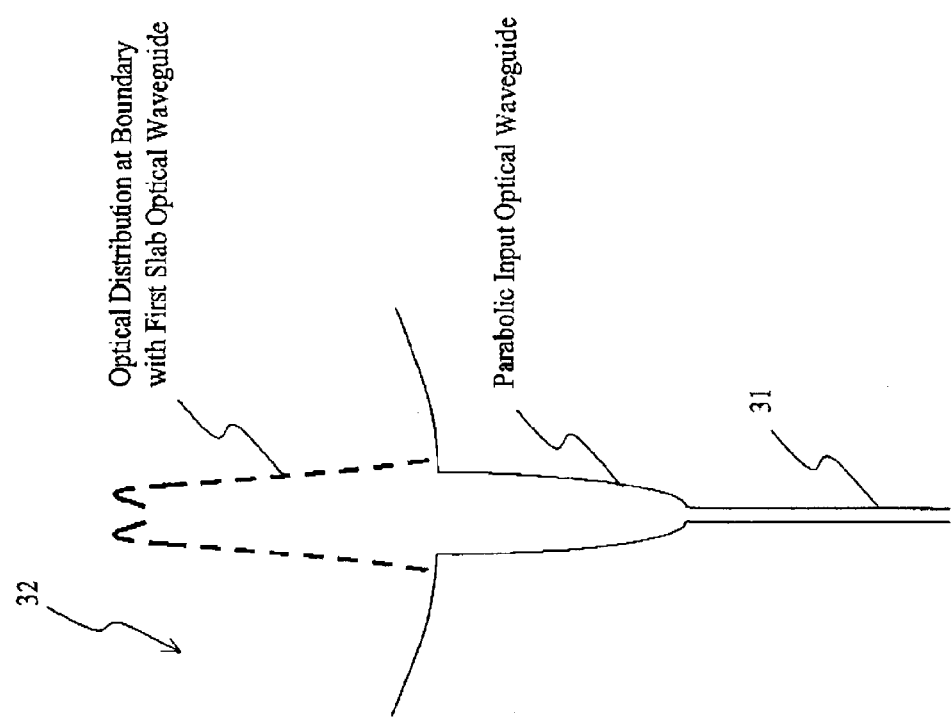
FIG. 8 is a drawing showing the roughly rectangular optical distribution achieved at the time when the shape and length of the parabolic input optical waveguide are set at appropriate values.
Figure 9:
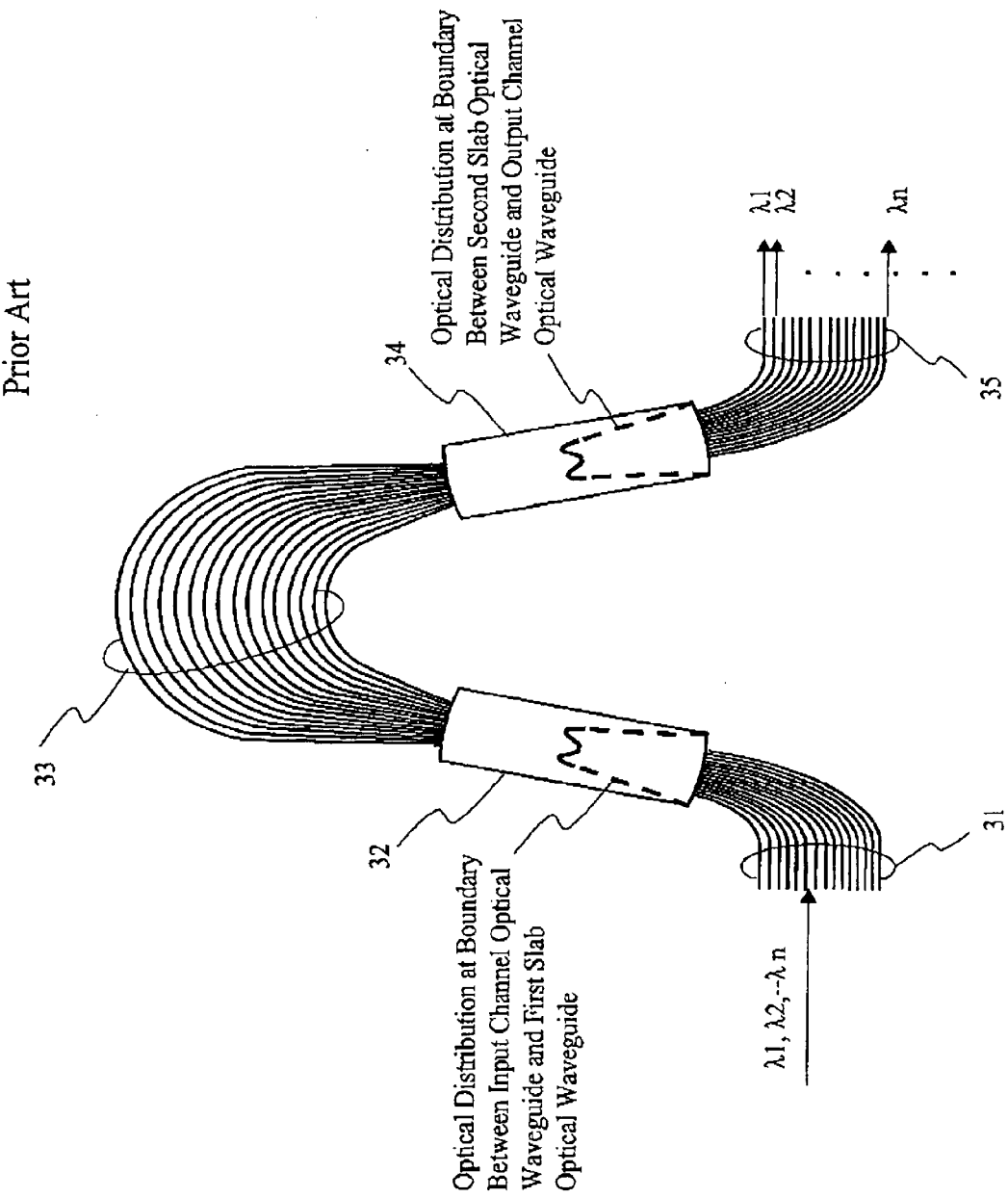
FIG. 9 is a drawing showing a roughly rectangular optical distribution being formed again at the boundary between the second slab optical waveguide and the output channel optical waveguide.
Figure 10:
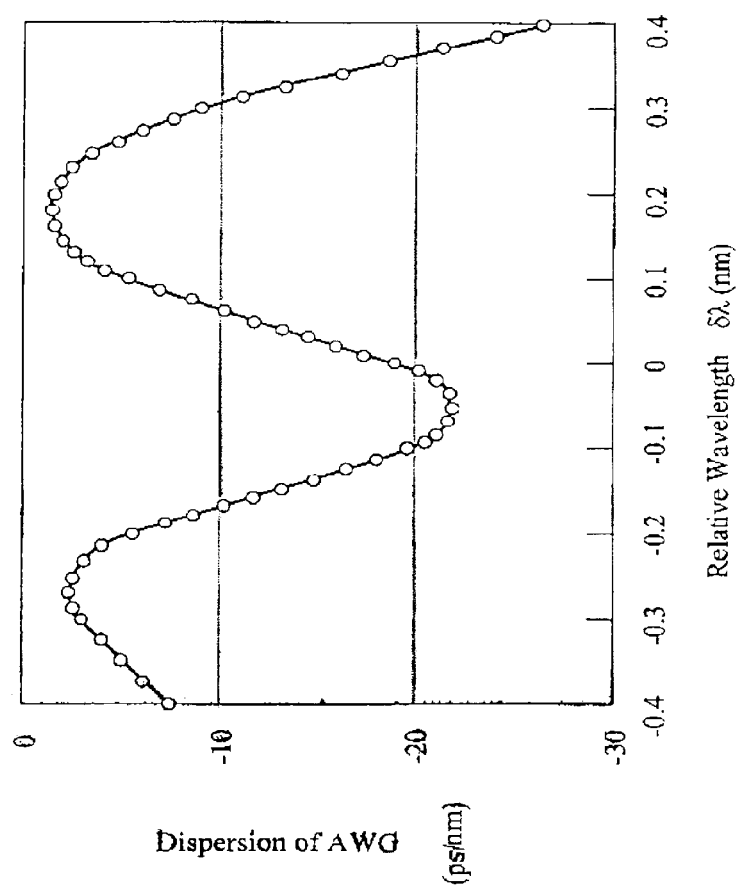
FIG. 10 is a drawing showing the experimental results of the dispersion of an AWG equipped with a parabolic input optical waveguide and having a flat spectrum.

The core shape of the input channel optical waveguide 11 near the boundary with the first slab optical waveguide 12 has a parabolic shape like that shown in FIG. 8, and when the parabolic shape and the length are set at appropriate values, it is possible to obtain a rectangular optical distribution like that shown in FIG. 8. For this reason, in the present embodiment, it becomes even easier to adjust the loss and phase of the arrayed optical waveguides. Further, even when the shape of the optical waveguide is approximated by a tapered shape instead of an accurate parabolic shape, it is still possible to obtain the same results.

Figure 14:
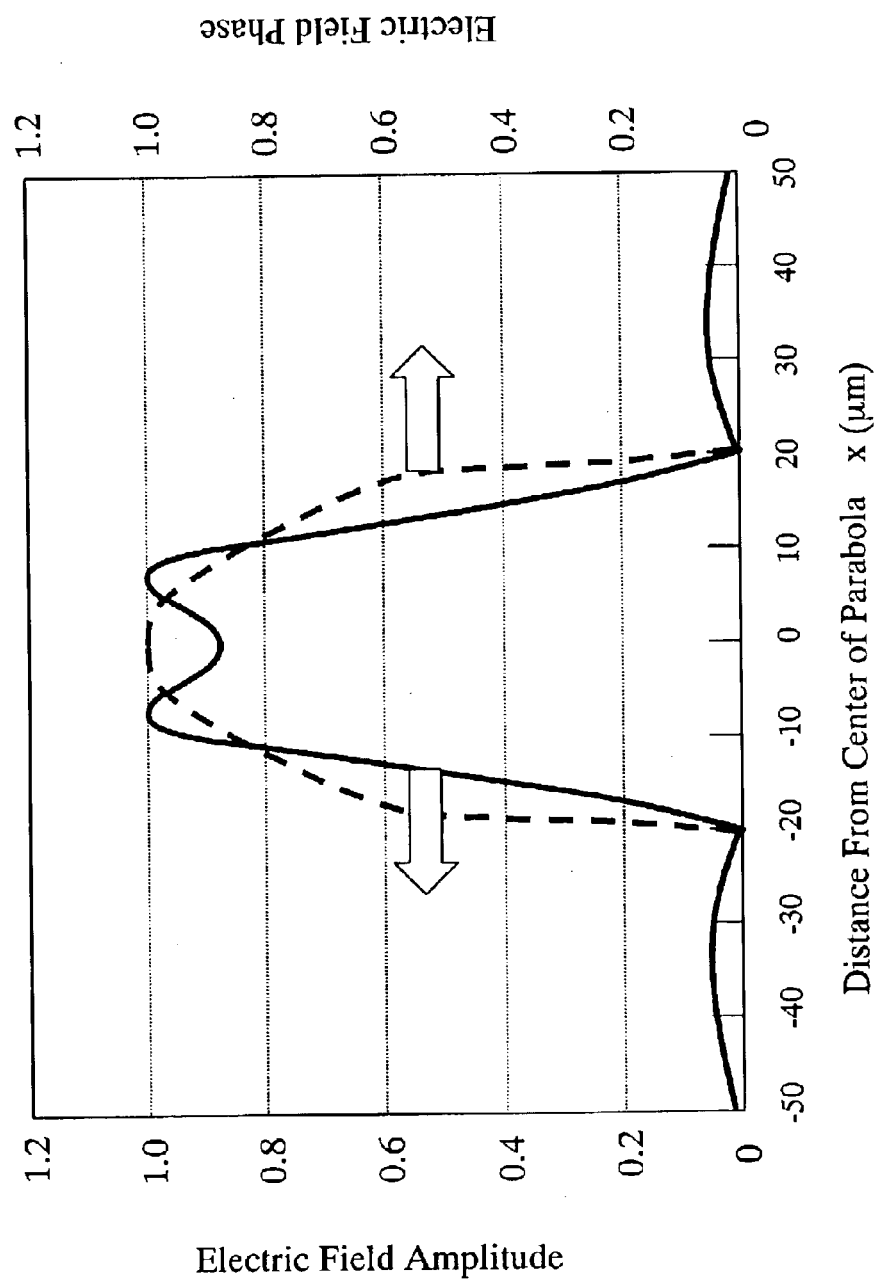
FIG. 14 is a drawing showing the calculation results of the electric field amplitude and the electric field phase formed at the boundary with the first slab optical waveguide by the propagating light which is incident on the parabolic input optical waveguide.

FIG. 14 shows the results of the calculation of the electric field amplitude and the electric field phase formed inside the first slab optical waveguide 12 by the incident light from the parabolic input optical waveguide in the first slab optical waveguide 12. The calculation method is a so-called beam propagation method (BPM) which is a typical simulation method of optical circuits, and this calculation method is well known by those skilled in the art.

Figure 15:
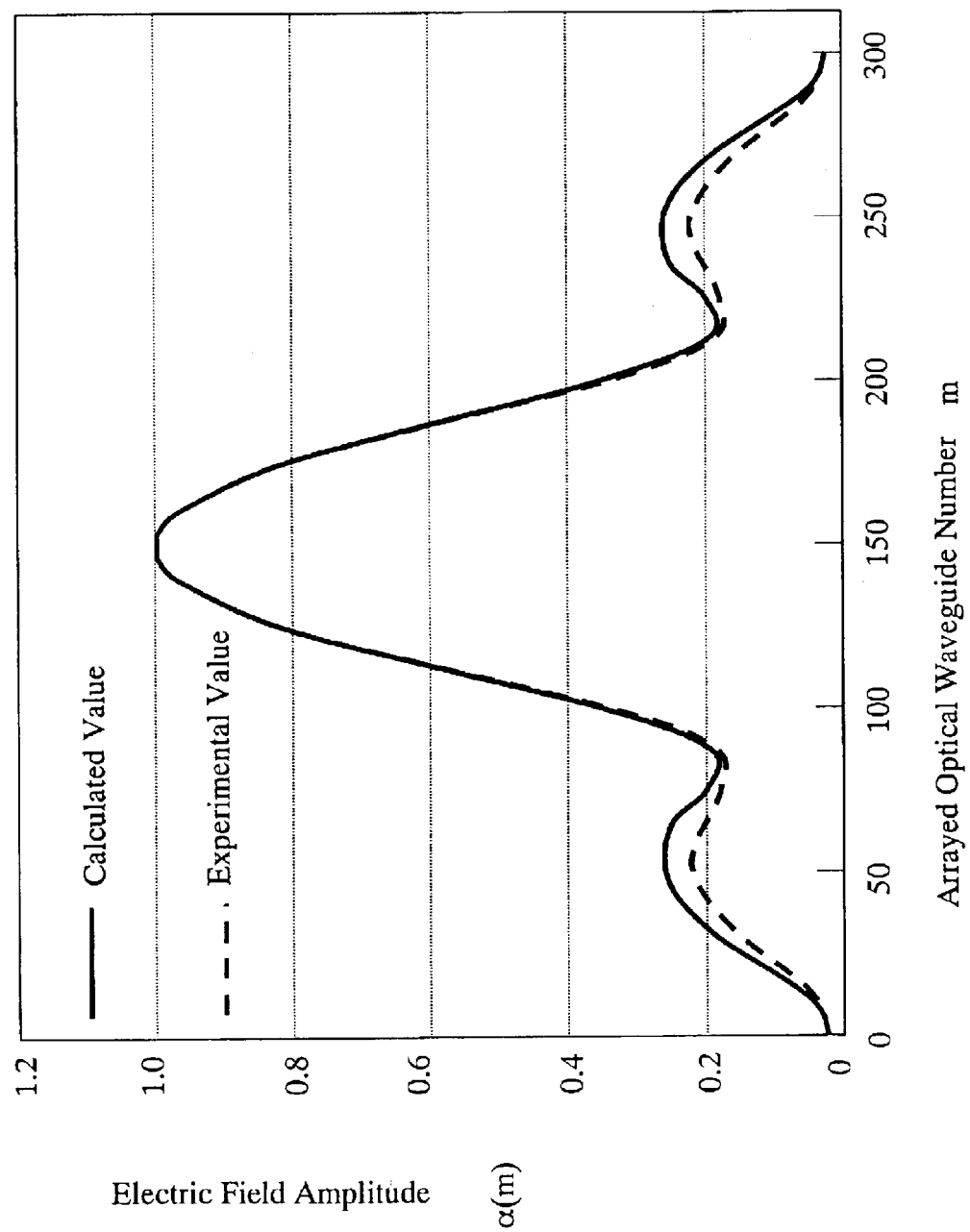
FIG. 15 is a drawing showing the theoretical results and the experimental results of the electric field amplitude excited at each of the optical waveguides after the light having the electric field amplitude and the electric field phase of FIG. 14 propagates through the first slab optical waveguide and reaches the channel optical waveguide array.
Figure 16:
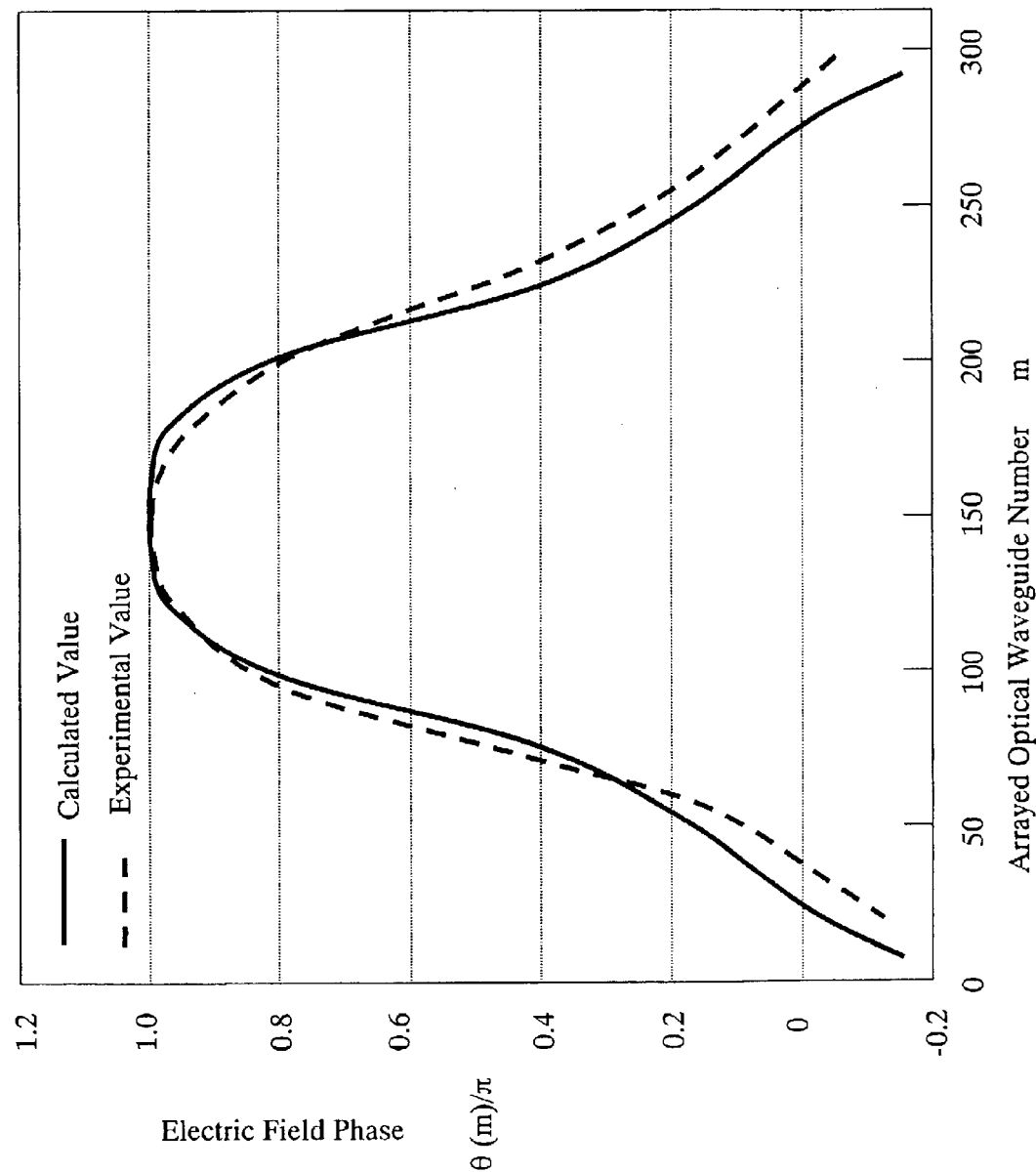
FIG. 16 is a drawing showing the theoretical results and the experimental results of the electric field phase excited at each of the optical waveguides after the light having the electric field amplitude and the electric field phase of FIG. 14 propagates through the first slab optical waveguide and reaches the channel optical waveguide array.

The light having the electric field amplitude and the electric field phase shown in FIG. 14 propagates through the first slab optical waveguide 12, and the calculated values of the electric field amplitude and the electric field phase excited in each of the optical waveguides of the channel optical waveguide array 13 are respectively shown in FIG. 15 and FIG. 16. The experimental values are also shown in FIG. 15 and FIG. 16. The method of measuring the electric field amplitude and the electric field phase in the channel optical waveguide array of an AWG is disclosed in measurement of phase error distributions in silica-based arrayed-waveguide grating multiplexers by using Fourier transform spectroscopy" (by K. Takada, Y. Inoue, H. Yamada and M. Horiguchi; Electronics Letters, vol. 30, pp. 1671~1672, 1994). Now, because FIG. 15 and FIG. 16 show that the calculated values and the experimental values of the electric field amplitude and the electric field phase excited in each of the optical waveguides of the channel optical waveguide array 13 match each other, it is understood that the actual electric field amplitude and the electric field phase can be estimated quite accurately by a computer simulation. When C(m) represents the electric field of the light excited at the m'th (m=1~N; where N is the number of optical waveguides of the channel optical waveguide array 13) optical waveguide of the channel optical waveguide array 13, the frequency characteristics E(ν) of the AWG is represented by Equation 1 given below.

$$E(v) = \sum_{m=1}^{N} C(m)\exp[-j\beta_c(m\Delta M + M_0)]$$ Equation 1

In Equation 1, ν represents the frequency of the light, $\beta_c(=2\pi v n_c/c$; where $n_c$ represents the equivalent index of refraction of the channel optical waveguide, and c represents the speed of light) represents the propagation constant of light inside the channel optical waveguide array 13, $\Delta M$ represents the waveguide length of adjacent arrayed optical waveguides of the channel optical waveguide array 13, and $M_0$ represents a fixed waveguide length. In this case, $\delta(m)$ is zero. Using the electric field amplitude a(m) and the electric field phase θ(m), the calculated value and the experimental value of the electric field C(m) of the light is represented by Equation 2 given below.

$$C(m) = a(m)\exp[-j\theta(m)]$$ Equation 2

From Equation 1 and Equation 2, the frequency characteristics E(ν) of the AWG can be represented by Equation 3 given below.

$$E(v) = \exp[-j\beta_c M_0] \sum_{m=1}^{N} a(m)[-j\{\beta_c m\Delta M + \theta(m)\}]$$ Equation 3
$$= A(v)\exp[-j\Theta(v)]$$

In general, it is known that the delay time τ(ν) of a transmission path such as an optical fiber and an optical filter such as an AWG can be obtained from Equation 4 given below.

$$\tau(v) = -\frac{1}{2\pi}\frac{d}{dv}[\arg(E)] = \frac{1}{2\pi}\frac{d\Theta(v)}{dv}$$ Equation 4

In this case, arg(E) is the phase term of the frequency characteristics E(ν), and this is −Θ(ν) in Equation 3. Next, the dispersion of the optical fiber and the AWG is obtained by taking the derivative of the delay time τ(ν) with respect to the wavelength λ(=c/ν; where c is the speed of light), and this is represented by Equation 5 given below.

$$\sigma = \frac{d\tau}{d\lambda} = -\frac{c}{\lambda^2}\frac{d\tau}{dv}$$ Equation 5

Figure 4:
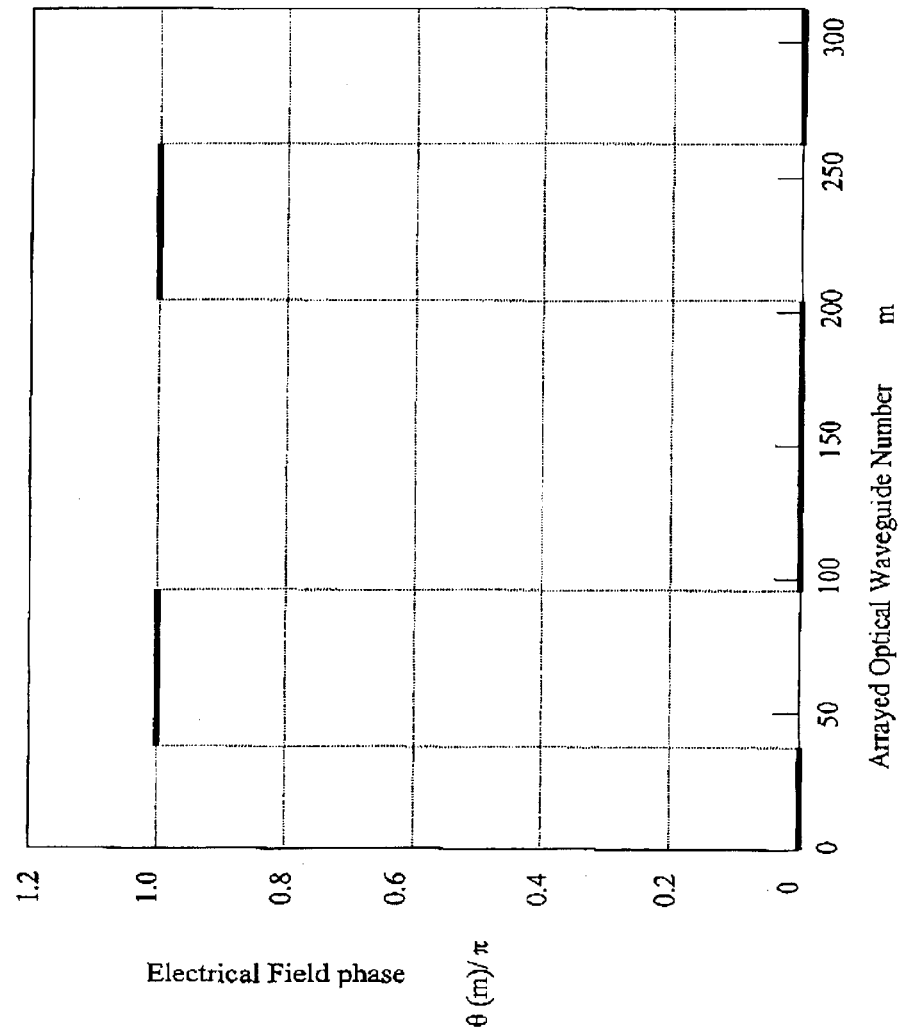
FIG. 4 is a drawing showing the electric field phase at the boundary between the channel optical waveguide array and the second slab optical waveguide which is required in order to achieve a flat demultiplexing spectrum.
Figure 5:
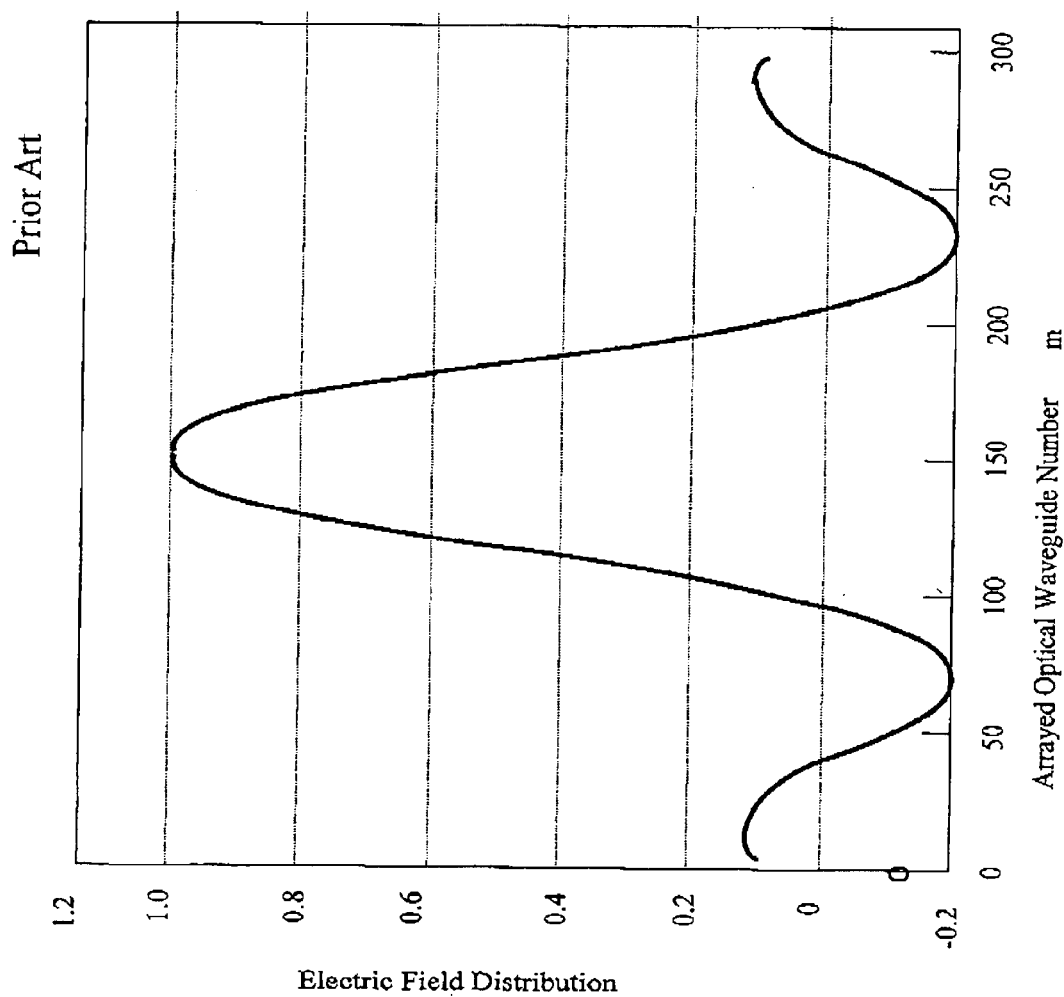
FIG. 5 is a drawing showing the electric field distribution at the boundary between the channel optical waveguide array and the second slab optical waveguide which is required in order to achieve a flat demultiplexing spectrum.
Figure 6:
FIG. 6 is a drawing showing the optical distribution at the boundary between the second slab region and the output channel optical waveguide.
Figure 11:
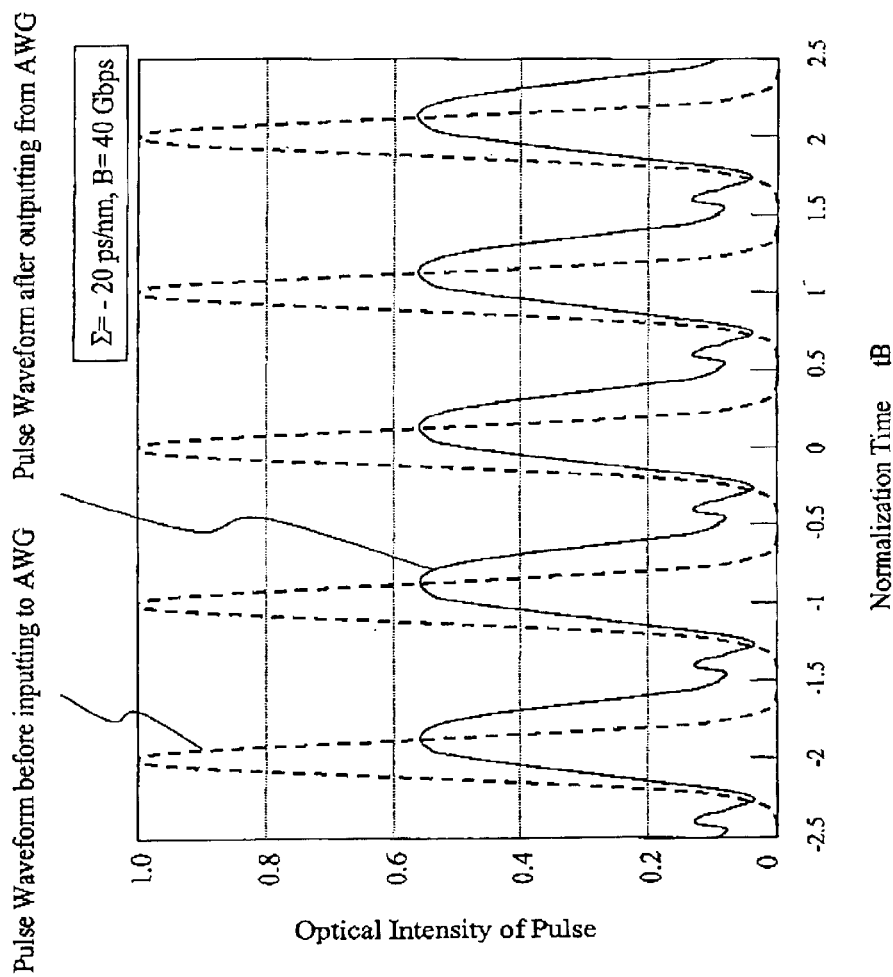
FIG. 11 is a drawing showing the results of calculating the pulse waveform distortion generated in the case where a pulse of B=40 Gbps is incident on an AWG having a dispersion of σ=−20 ps/nm.
Figure 17:
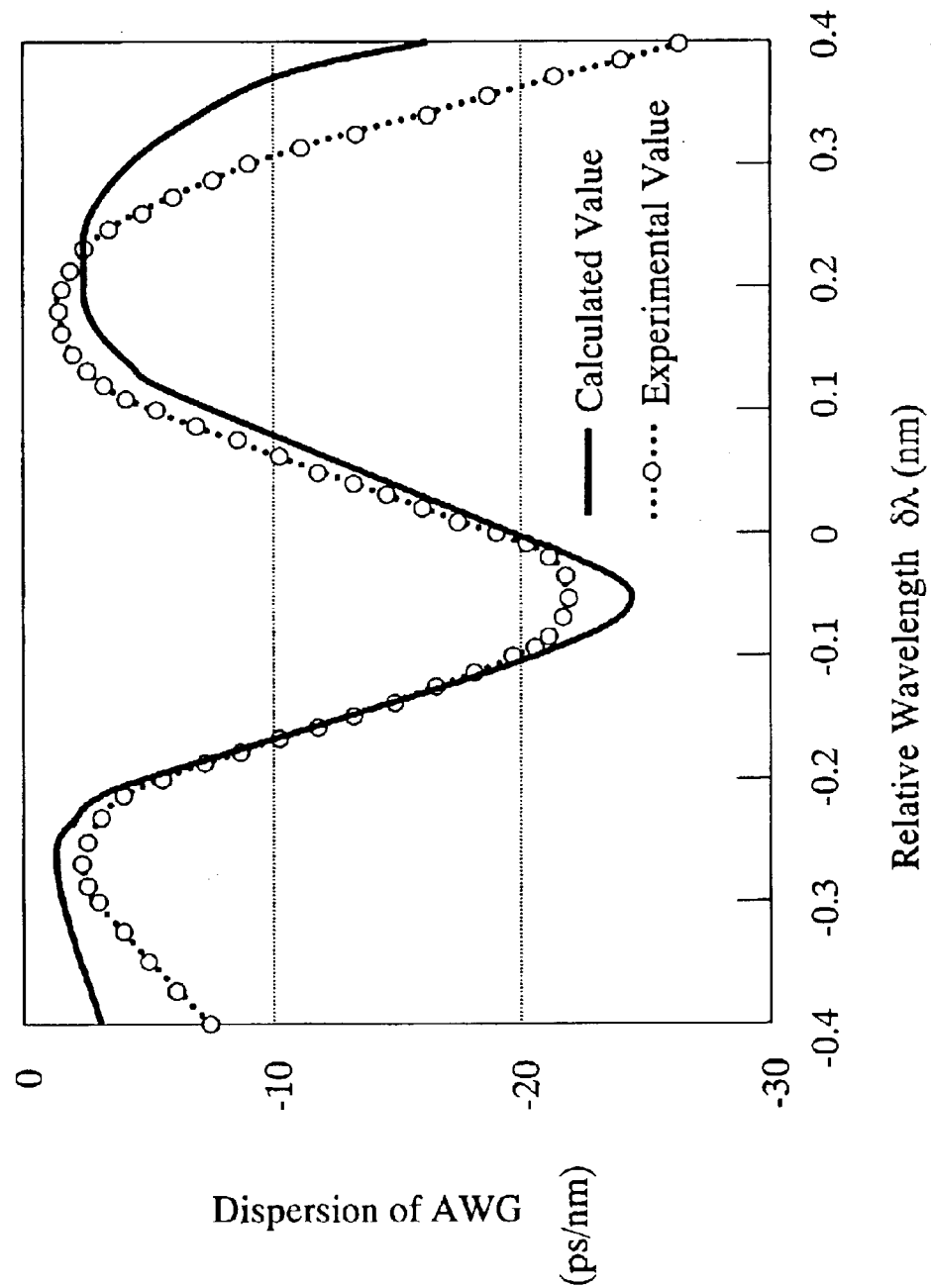
FIG. 17 is a drawing showing the theoretical results and the experimental results of the dispersion of the AWG in accordance with Equation 4 and Equation 5 using the calculated values of the electric field amplitude of FIG. 15 and the electric field phase of FIG. 16.

FIG. 17 shows the results of calculating the dispersion of the AWG from Equation 4 and Equation 5 using the calculated values of the electric field amplitude and the electric field phase of FIG. 4 and FIG. 5 as the electric field amplitude a(m) and the electric field phase θ(m) in Equation 3. For the sake of comparison, FIG. 17 also shows the experimental results of the dispersion of the AWG. As shown in FIG. 11, in the case where the AWG itself has a dispersion |σ|=20 ps/nm, the signal waveform distortion becomes large, whereby there is the problem that it becomes impossible to use the AWG in a high-speed transmission system where B=40 Gbps or higher.

Figure 7:
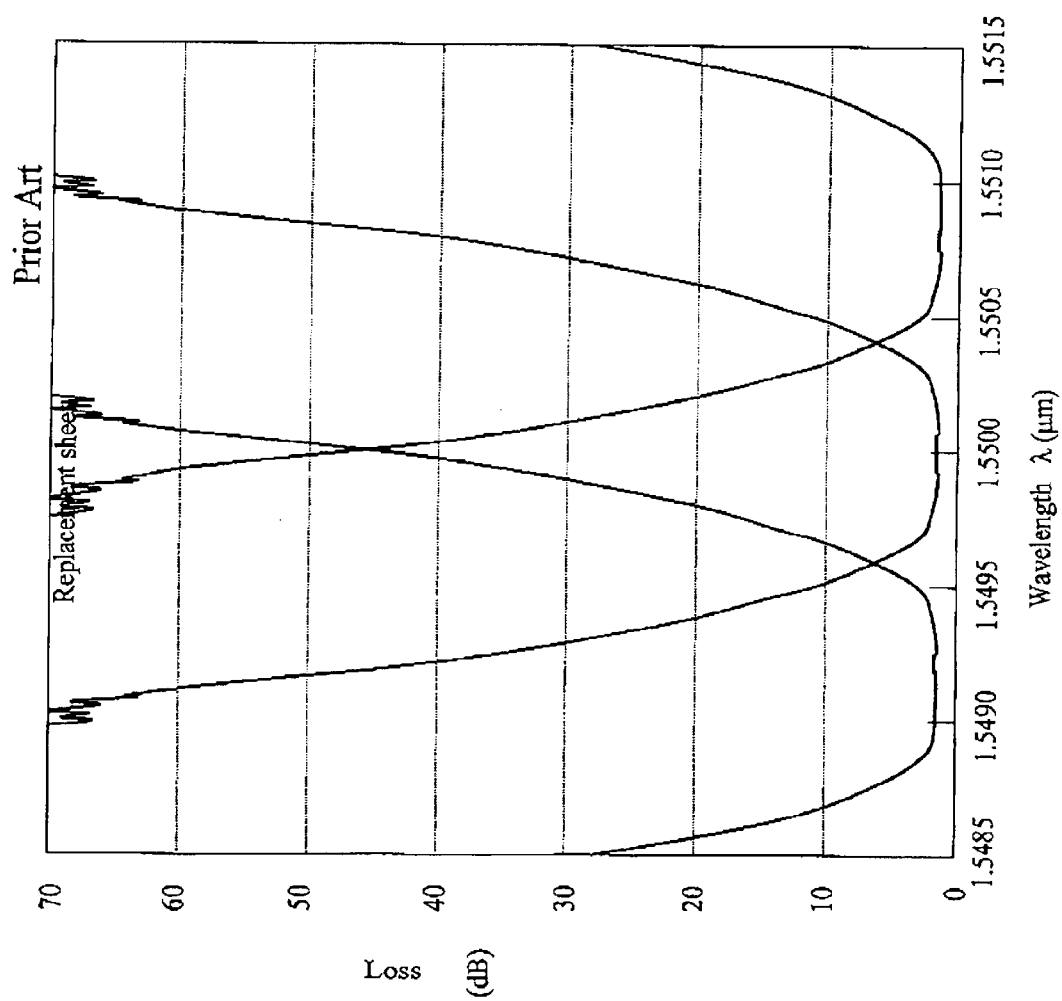
FIG. 7 is a drawing showing the demultiplexing spectral characteristics of an AWG having a flat spectrum.
Figure 18:
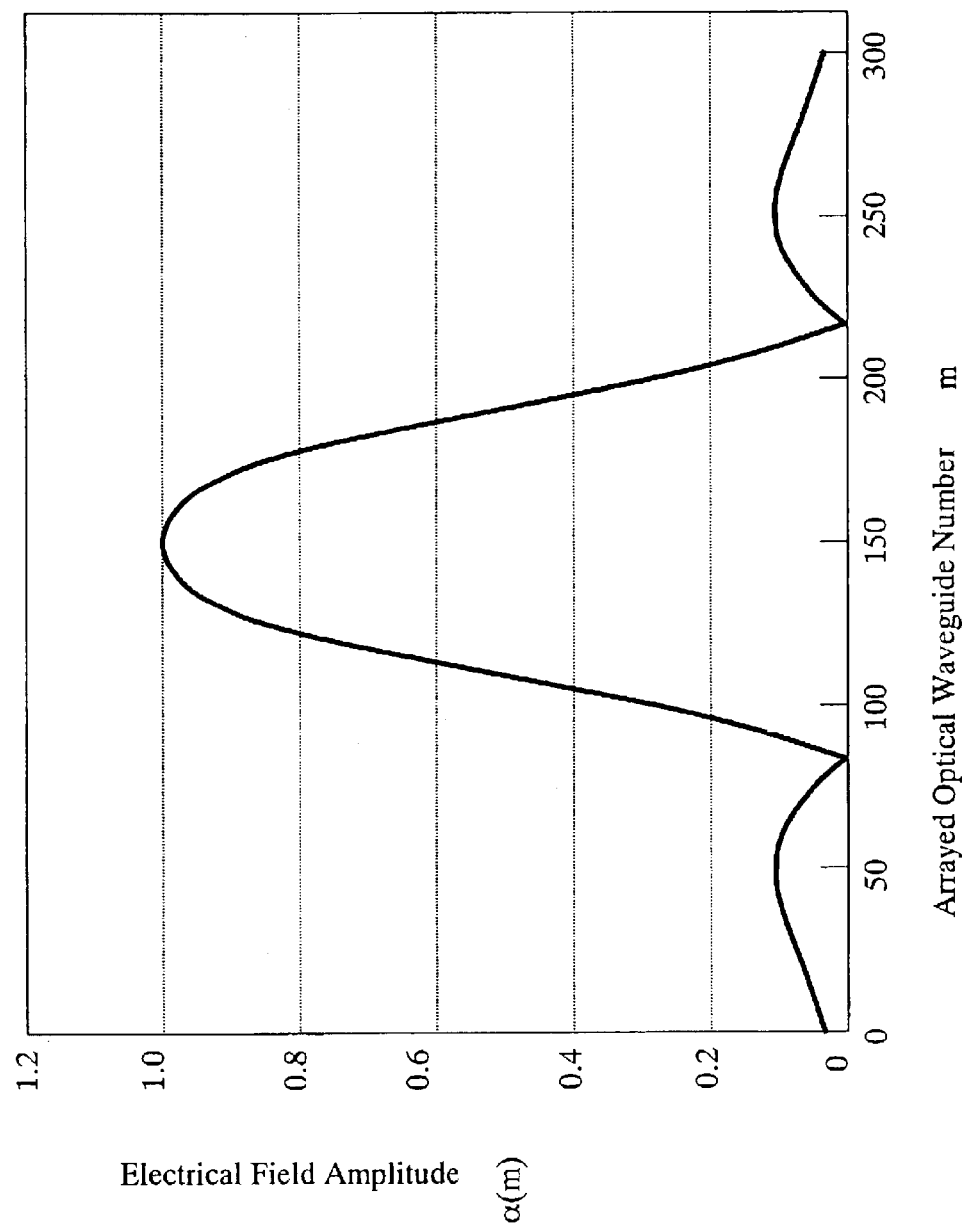
FIG. 18 is a drawing showing the electric field amplitude required for achieving a low-dispersion AWG.
Figure 19:
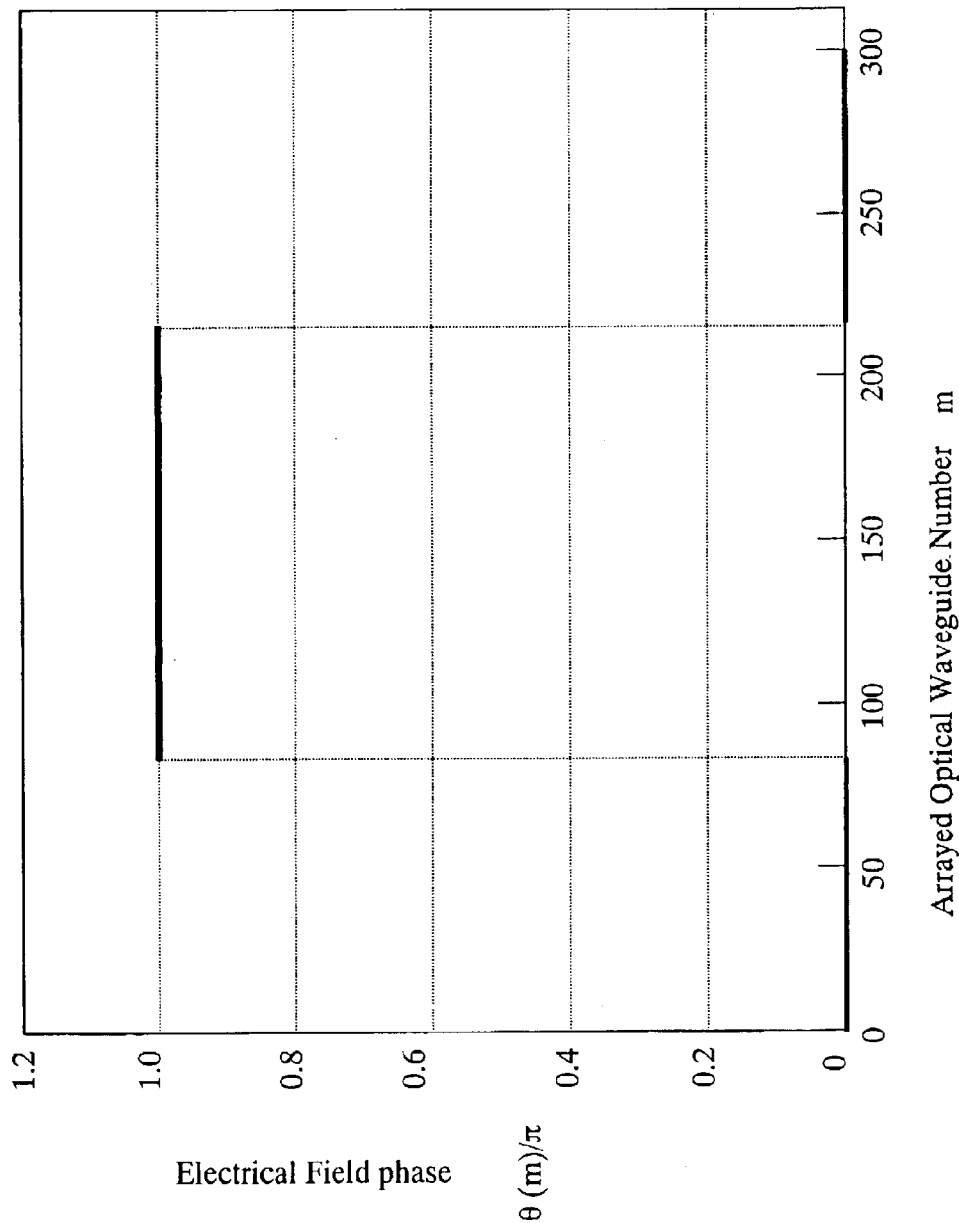
FIG. 19 is a drawing showing the electric field phase required for achieving a low-dispersion AWG.
Figure 20:
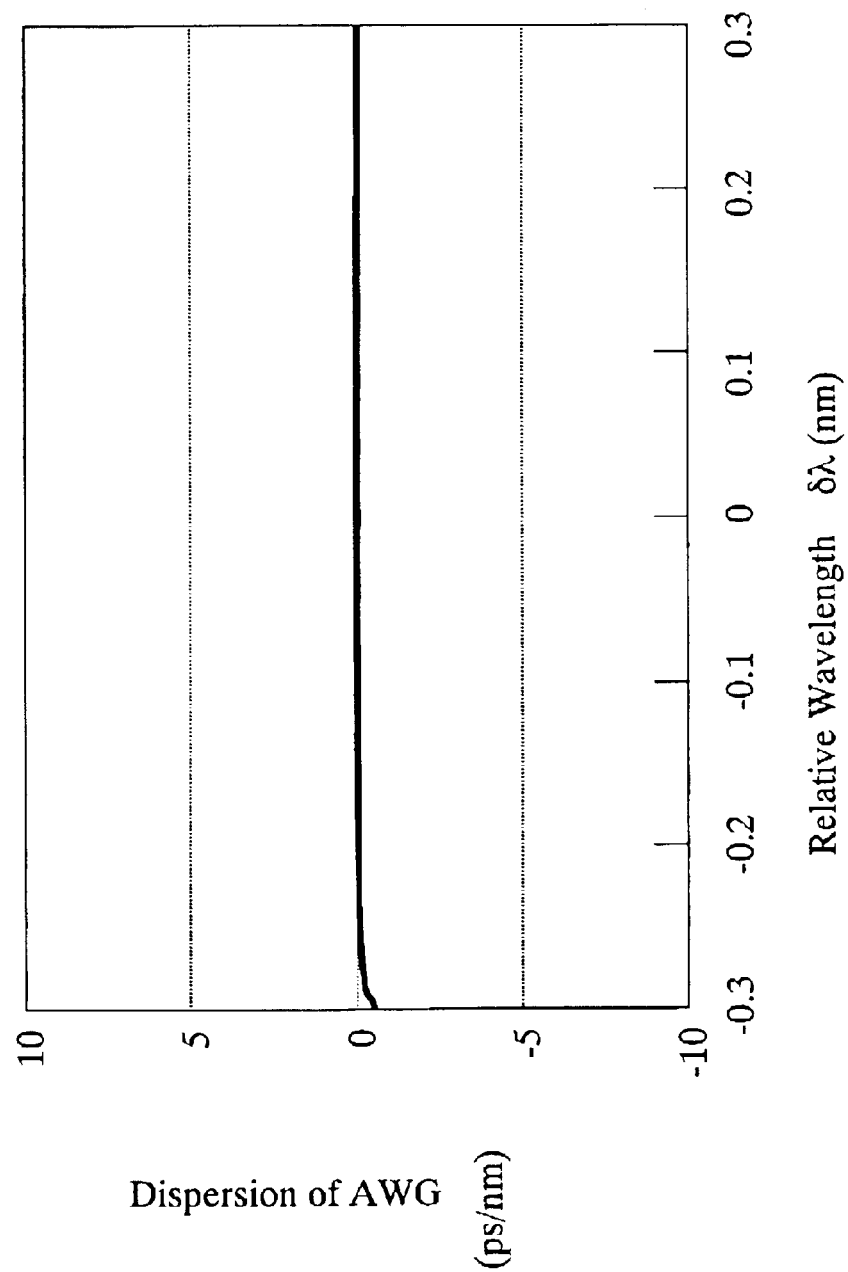
FIG. 20 is a drawing showing the theoretical results of the dispersion of the AWG in accordance with Equation 4 and Equation 5 using the calculated values of the electric field amplitude of FIG. 18 and the electric field phase of FIG. 19.

In the type of flat spectrum AWG that generates a roughly rectangular optical distribution in the input channel optical waveguide, the reason a large dispersion is generated is understood from a detailed examination of the dispersion characteristics to be due to the fact that the variation of electric field phase θ(m) in Equation 2 and Equation 3 is dependent on the arrayed optical waveguide number m. Accordingly, it is understood that the dispersion of the AWG can be reduced by eliminating the dependency of the electric field phase θ(m) with respect to the arrayed optical waveguide number m. Next, the dispersion was calculated for the case where the electric field amplitude shown in FIG. 18 and the electric field phase shown in FIG. 19 were achieved by controlling the loss and waveguide length of each optical waveguide of the channel optical waveguide array 13 using a method described later. Further, the electric field distribution a(m)exp[−jθ(m)] inside the channel optical waveguide array 13 in the case where an electric field amplitude and an electric field phase like those shown in FIG. 18 and FIG. 19 are achieved forms a sinc function basically the same as that of FIG. 5, and good flat spectrum characteristics similar to those shown in FIG. 7 were obtained. FIG. 20 shows the results of calculating the dispersion of the AWG from Equation 4 and Equation 5 using the calculated values of the electric field amplitude and the electric field phase of FIG. 18 and FIG. 19 as the electric field amplitude a(m) and the electric field phase θ(m) in Equation 3. From a comparison with FIG. 17, it is understood that a sharp reduction of the dispersion is possible.

Figure 21:
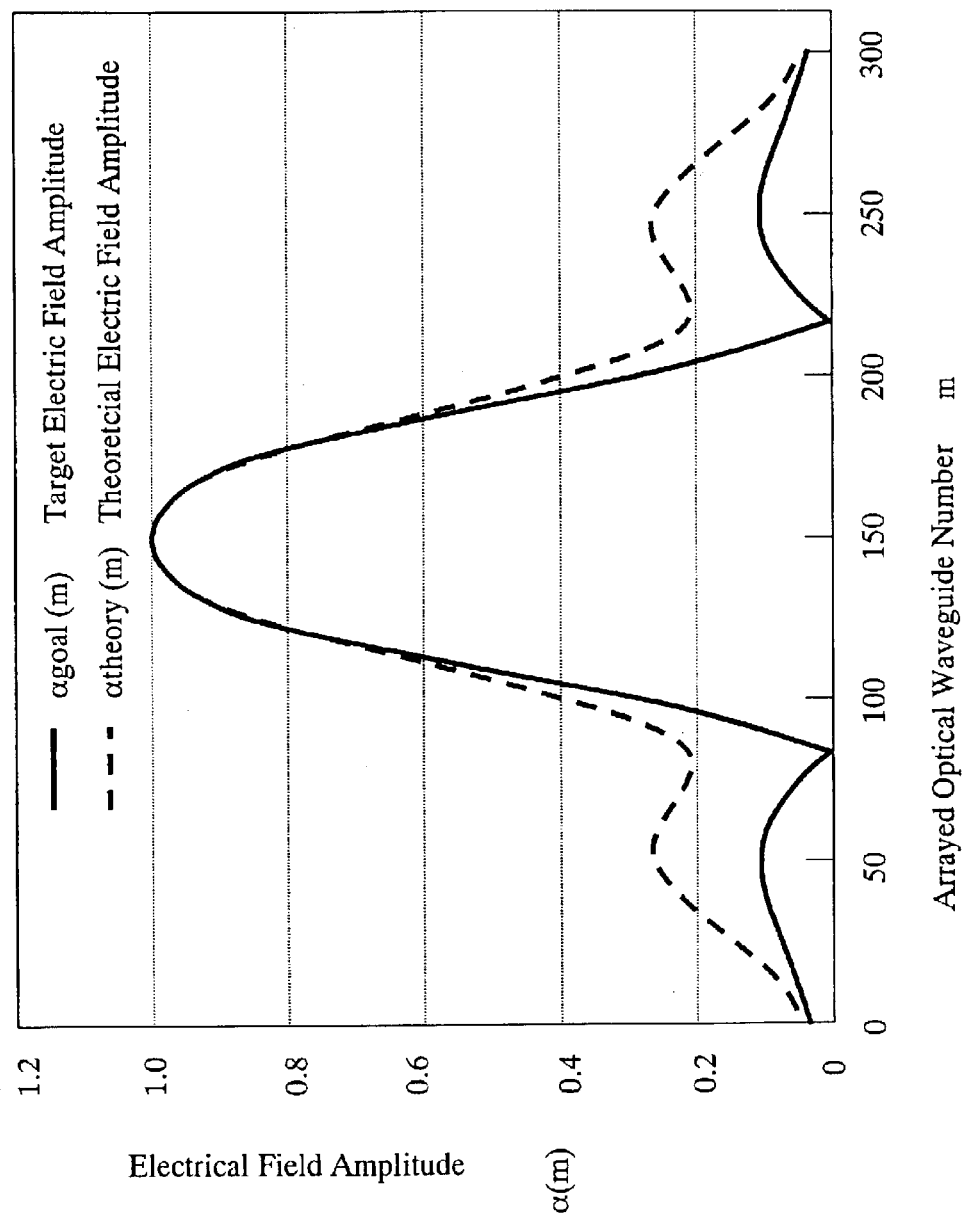
FIG. 21 is a drawing showing the theoretical value and the target value of the electric field amplitude excited at the channel optical waveguide array.

Next, a description will be given for the method of achieving an electric field amplitude like that shown in FIG. 18 and an electric field phase like that shown in FIG. 19 by controlling the loss and waveguide length of each optical waveguide of the channel optical waveguide array 13. First, FIG. 21 shows the theoretical value $\alpha_{theory}(m)$ (the same as FIG. 15) and the target value $\alpha_{goal}(m)$ (the same as FIG. 18) of the electric field amplitude excited at the channel optical waveguide array 13. As shown in FIG. 15, the theoretical electric field amplitude matches well with the actual electric field amplitude excited at the channel optical waveguide array 13. Accordingly, using the theoretical electric field amplitude $\alpha_{theory}(m)$ of the m'th optical waveguide and the target electric field amplitude $\alpha_{goal}(m)$, the loss α(m) given by Equation 6 below may be added to the m'th optical waveguide.

$$\alpha(m) = -10\log\left[\frac{\alpha\ \text{goal}\ (m)}{\alpha\ \text{theory}(m)}\right]^2\ (\text{dB}) \quad \text{Equation 6}$$

Figure 22:
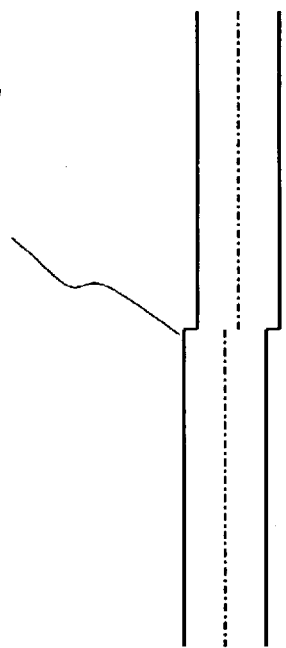
FIG. 22 is a drawing showing the state in which an axial shift is carried out for an optical waveguide of the channel optical waveguide array.

As for the method of adding the loss to the channel optical waveguide, there is a method of shifting the central axis of the optical waveguide at a certain position of the channel optical waveguide array like that shown in FIG. 22.

Figure 23:
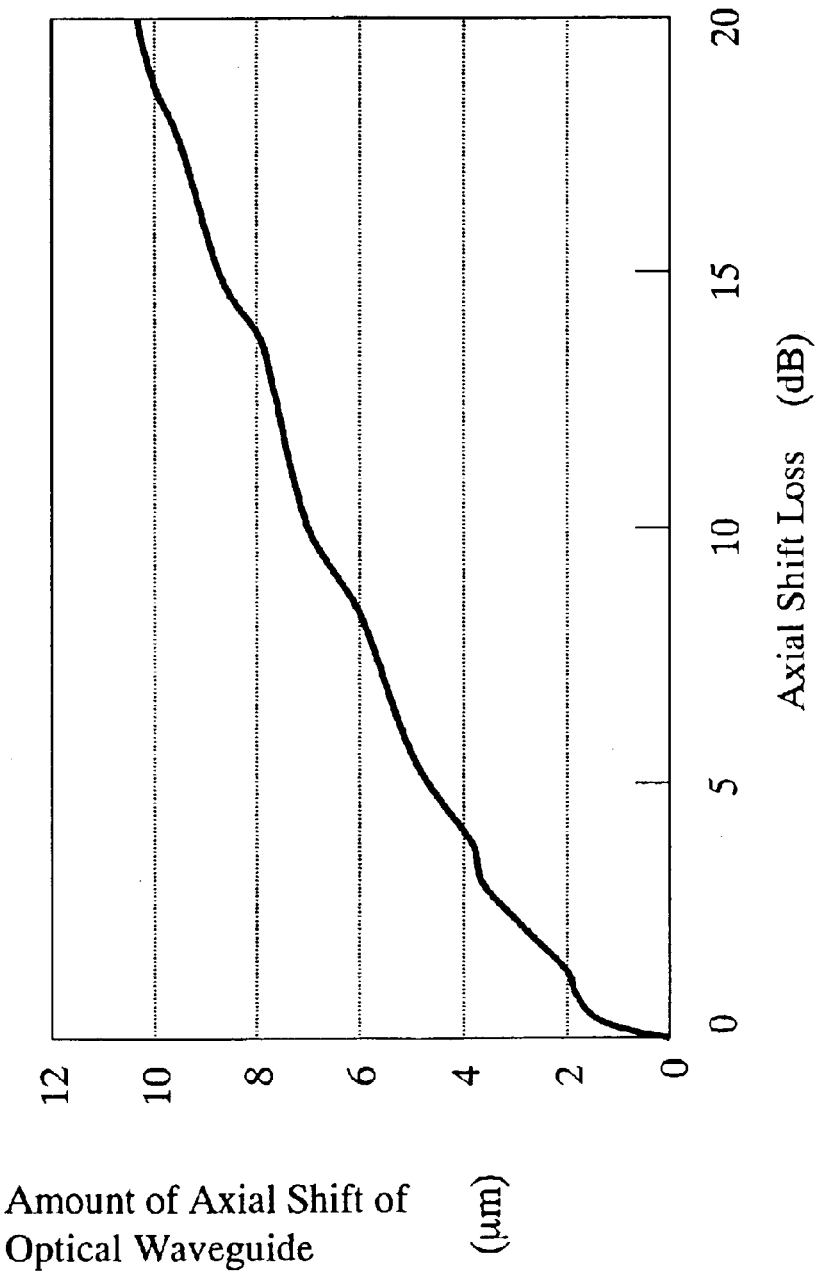
FIG. 23 is a drawing showing the experimentally determined amount of shift $X_{shift}(\mu m)$ required in order to obtain the desired loss α(dB) when carrying out the axial shift of an optical waveguide.

FIG. 23 is related to the method of shifting the central axis of the waveguide, and shows the experimental results of the amount of axial shift $X_{shift}(\mu m)$ required for the desired axial shift loss α(dB). In this connection, the optical waveguide used here has a core width 2a=6.0 μm, a core thickness 2t=6.0 μm, and a refractive index difference Δ=0.75%. The loss α(dB) that should be added to the m'th optical waveguide is obtained from Equation 6, and the amount of axial shift $X_{shift}(\mu m)$ of the optical waveguide required to achieve this α(m) (dB) is determined using FIG. 23.

Figure 24:
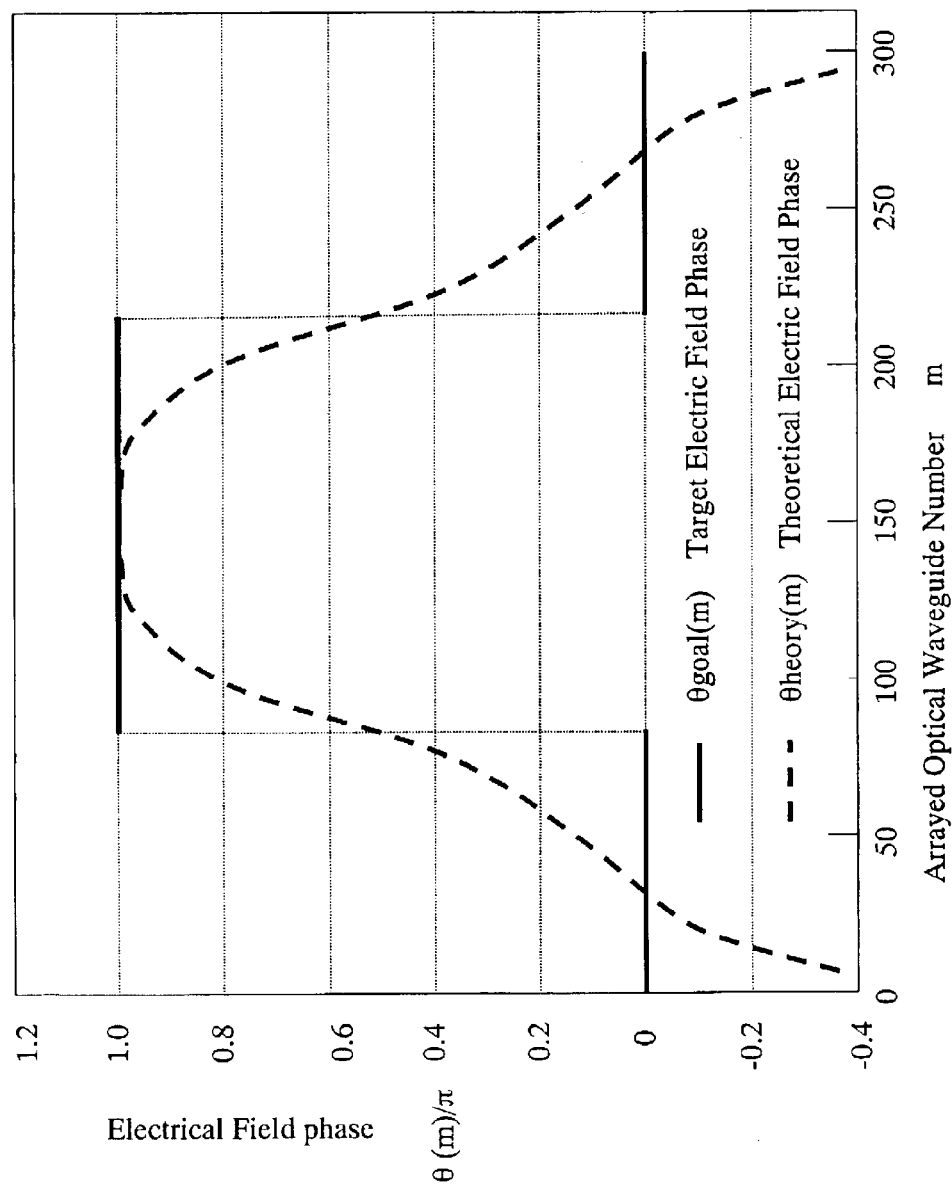
FIG. 24 is a drawing showing the theoretical value and the target value of the electric field phase excited at the channel optical waveguide array.

Next, FIG. 24 shows the theoretical value $\theta_{theory}(m)$ (the same as FIG. 16) and the target value $\theta_{goal}(m)$ (the same as FIG. 19) of the electric field phase excited at the channel optical waveguide array 13. As shown in FIG. 16, the theoretical electric field phase matches well with the actual electric field phase excited at the channel optical waveguide array 13. In this case, using the theoretical electric field phase $\theta_{theory}(m)$ of the m'th optical waveguide, Equation 3 can be rewritten to obtain Equation 7 given below.

$$E(v) = \sum_{m=1}^{N} \alpha\ \text{goal}\ (m)\exp[-j\{(\beta_c m\Delta M + \beta_c \delta(m)) + \theta\ \text{theory}\ (m)\}] \quad \text{Equation 7}$$

However, when δ(m) is taken into consideration, the electric field amplitude is assumed to form the target electric field amplitude $\alpha_{goal}(m)$ by the method described above. Further, the term $\exp[-j\beta_c M_0]$ can be omitted because it has no effect on the dispersion characteristics of the AWG, and the target frequency characteristics are given by Equation 8 below.

$$Egoal(v) = \sum_{m=1}^{N} \alpha\ \text{goal}\ (m)\exp[-j\{\beta_c m\Delta M + \theta\ \text{goal}\ (m)\}] \quad \text{Equation 8}$$

In order for Equation 7 to match Equation 8, it is understood that the conditions given by Equation 9 below must be satisfied.

$$\beta_c \delta(m) = \theta\text{goal}(m) - \theta\text{theory}(m) \quad \text{Equation 9}$$

Accordingly, if λ is the wavelength of the light, then the waveguide length δ(m) that should be added to or subtracted from the m'th optical waveguide is given by Equation 10 below.

$$\delta(m) = \lambda[\theta\text{goal}(m) - \theta\text{theory}(m)]/(2\pi n_c) \quad \text{Equation 10}$$

Now, in the case where $\theta_{goal}(m) - \theta_{theory}(m) > 0$, because δ(m)>0, the waveguide length is added, and in the case where $\theta_{goal}(m) - \theta_{theory}(m) < 0$, because δ(m)<0, the waveguide length is subtracted.

As described above, in the present embodiment, it is possible to reduce the dispersion of the AWG by adjusting the loss and phase of the arrayed optical waveguides using the theoretical electric field phase and the theoretical electric field amplitude.

Embodiment 2

The second embodiment of the present invention will now be described. In the first embodiment, the propagating light that is incident from the parabolic optical waveguide of the input channel optical waveguide propagates through the first slab optical waveguide, and after this light reaches the channel optical waveguide array, calculations were carried out to determine what kind of optical distribution was excited at each of the optical waveguides, and then the loss α(m)(dB) that should be added to the m'th optical waveguide was calculated using the theoretical value $\alpha_{theory}$(m) and the target value $\alpha_{goal}$(m) of the electric field amplitude excited at the channel optical waveguide array. Further, the amount of phase Θ(m) (rad) that should be adjusted for the m'th optical waveguide was calculated using the theoretical value $\theta_{theory}$(m) and the target value $\theta_{goal}$(m) of the electric field phase excited at the channel optical waveguide array.

In the present invention, a trial optical multiplexer was manufactured for experimental use, and in this trial optical multiplexer, the propagating light that is incident from the parabolic optical waveguide of the input channel optical waveguide propagates through the first slab optical waveguide, and after this light reaches the channel optical waveguide array, calculations were carried out to determine what kind of optical distribution was excited at each of the optical waveguides. Next, the loss α(m)(dB) that should be added to the m'th optical waveguide was calculated from the difference between the experimental value $\alpha_{exper}$(m) and the target value $\alpha_{goal}$(m) of the electric field amplitude excited at the channel optical waveguide array. Further, the amount of phase Θ(m) (rad) that should be adjusted for the m'th optical waveguide was calculated from the difference between the experimental value $\theta_{exper}$(m) and the target value $\theta_{goal}$(m) of the electric field phase excited at the channel optical waveguide array. Then, based on the calculated loss α(m) that should be added to the m'th optical waveguide and the calculated amount of phase Θ(m) that should be adjusted for the m'th optical waveguide, a target optical multiplexer was manufactured.

As shown in FIG. 12, the present embodiment is an optical multiplexer in which the waveguide length of adjacent arrayed optical waveguides of the channel optical waveguide array 13 is ΔM=31 μm, the number of optical waveguides of the channel optical waveguide array 13 is N=290, the number of channels of the multiplexer is $N_{ch}$=64, the channel space of the multiplexer is S=100 GHz, and the central channel wavelength is $\lambda_{center}$=1.55 μm. In the first slab optical waveguide 12 shown in FIG. 13(a) or the second slab optical waveguide 14 shown in FIG. 13(b), the waveguide space of the input channel optical waveguide 11 and the output channel optical waveguide 15 is D=25 μm, the waveguide space of the channel optical waveguide array 13 is d=20 μm, the radius of curvature of the first slab optical waveguide 12 and the second slab optical waveguide 14 is f=30.76 mm, the length of the parabolic input optical waveguide is l=400 μm, and the width of the tip of the parabolic input is w=23 μm.

The incident light from the parabolic input optical waveguide in the first slab optical waveguide 12 propagates through the first slab optical waveguide 12, and the experimental values of the electric field amplitude and the electric field phase excited at each optical waveguide are respectively shown by broken lines in FIG. 15 and FIG. 16. The method of measuring the electric field amplitude and the electric field phase in the channel optical waveguide array of an AWG is disclosed in measurement of phase error distributions in silica-based arrayed-waveguide grating multiplexers by using Fourier transform spectroscopy" (by K. Takada, Y. Inoue, H. Yamada and M. Horiguchi; Electronics Letters, vol. 30, pp. 1671~1672, 1994).

Next, Next, a description will be given for the method of achieving an electric field amplitude like that shown in FIG. 18 and an electric field phase like that shown in FIG. 19 by controlling the loss and waveguide length of each optical waveguide of the channel optical waveguide array 13. First, using the experimental electric field amplitude $\alpha_{exper}$(m) of the m'th optical waveguide shown by the broken like of FIG. 15 and the target electric field amplitude $\alpha_{goal}$(m) shown in FIG. 18, the loss α(m) given by Equation 11 below may be added to the m'th optical waveguide.

$$\alpha(m) = -10\log\left[\frac{\alpha\ \text{goal}\ (m)}{\alpha\ \text{exper}\ (m)}\right]^2\ \text{(dB)} \qquad \text{Equation 11}$$

As for the method of adding the loss to the channel optical waveguide, there is a method of shifting the central axis of the optical waveguide at a certain position of the channel optical waveguide array like that shown in FIG. 22.

Next, using the experimental value $\theta_{exper}$(m) of the electric field phase excited at the channel optical waveguide array 13 as shown by the broken line of FIG. 16 and the target electric field phase $\theta_{goal}$(m) shown in FIG. 19, Equation 3 can be rewritten to obtain Equation 12 given below.

$$E(v) = \sum_{m=1}^{N} \alpha\ \text{goal}\ (m)\exp[-j\{(\beta_c m\Delta M + \beta_c \delta(m)) + \theta\ \text{esper}\ (m)\}] \qquad \text{Equation 12}$$

However, when δ(m) is taken into consideration, the electric field amplitude is assumed to form the target electric field amplitude $\alpha_{goal}$(m) by the method described above. Further, the term $\exp[-j\beta_c M_0]$ can be omitted because it has no effect on the dispersion characteristics of the AWG, and the target frequency characteristics are given by Equation 13 below.

$$Egoal(v) = \sum_{m=1}^{N} \alpha\ \text{goal}\ (m)\exp[-j\{\beta_c m\Delta M + \theta\ \text{goal}\ (m)\}] \qquad \text{Equation 13}$$

In order for Equation 12 to match Equation 13, it is understood that the conditions given by Equation 14 below must be satisfied.

$$\beta_c \delta(m) = \theta\text{goal}(m) - \theta\text{exper}(m) \qquad \text{Equation 14}$$

Accordingly, if λ is the wavelength of the light, then the waveguide length δ(m) that should be added to or subtracted from the m'th optical waveguide is given by Equation 15 below.

$$\delta(m) = \lambda[\theta\text{goal}(m) - \theta\text{exper}(m)]/(2\pi n_c) \qquad \text{Equation 15}$$

Now, in the case where $\theta_{goal}$(m)−$\theta_{exper}$(m)>0, because δ(m)>0, the waveguide length is added, and in the case where $\theta_{goal}(m)-\theta_{exper}(m)<0$, because $\delta(m)<0$, the waveguide length is subtracted.

As described above, in the present embodiment, it is possible to reduce the dispersion of the AWG by adjusting the loss and phase of the arrayed optical waveguides using the theoretical electric field phase and the theoretical electric field amplitude.

Embodiment 3

In the first embodiment of the present invention, the method of providing the desired loss (dB) was described as being a method in which the central axis of the optical waveguide is shifted as shown in FIG. 22.

As one method of providing the loss, in the case where the method of shifting the central axis of the optical waveguide of the channel optical waveguide array 13 described above is carried out, because the arc of the channel optical waveguide array 13 needs to be returned to its original position, two positions are required for shifting the axis. Now, because the axis is shifted between two positions, the amount of loss provided at one axial shift position becomes $\alpha/2$ (dB) which is half of the axial shift loss $\alpha$ shown in FIG. 23.

Figure 25:
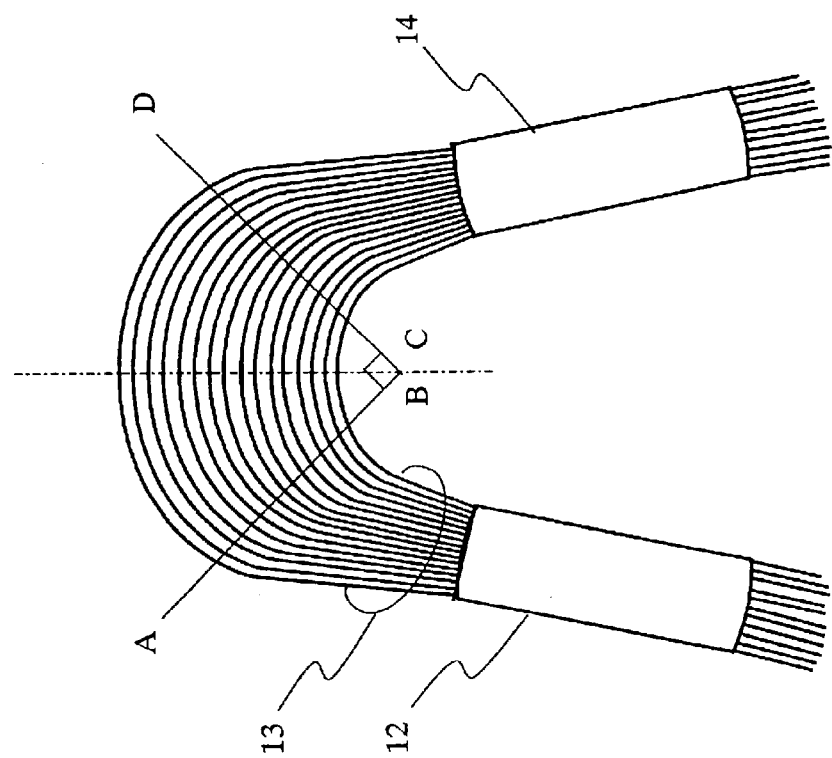
FIG. 25 is a drawing showing the optimum position for carrying out the axial shift in the channel optical waveguide array, or the optimum position for providing a gap.

As for the portion where the axis is shifted for the m'th optical waveguide of the channel optical waveguide array 13, such shift may occur above the m'th optical waveguide, but when left and right symmetrical axial shift portions are established with respect to the central axis of the channel optical waveguide array 13, there is the advantage that it becomes easy to carry out design and mask production. Further, stray light is generated from the axial shift portion, and a design needs to be provided to prevent such stray light from being incident on the axial shift portion of another optical waveguide. For example, the position of the axial shift portion of the optical waveguide in FIG. 25 will be described. An optimum design is obtained when the axial shift portions are arranged at two portions of a line AB and a line CD positioned at 45 degrees with respect to the center line of FIG. 25, namely, a line AB and a line CD positioned 45 degrees left and right with respect to the center of the arc of the channel optical waveguide array 13.

The desired loss $\alpha$(dB) will have a different value depending on each optical waveguide inside the channel optical waveguide array 13. Accordingly, in the case where the determined loss $\alpha$(dB) of a certain optical waveguide is very large, the amount of axial shift $X_{shift}(\mu m)$ thereof will become too large, and because this will cause overlapping with an adjacent optical waveguide, it will not be possible to achieve the desired results. In this way, in the case where the desired loss $\alpha$(dB) is large, one arrangement of the present invention is to eliminate such optical waveguide from the channel optical waveguide array at the beginning, namely, remove such optical waveguide or shut off such optical waveguide.

Embodiment 4

Figure 26:
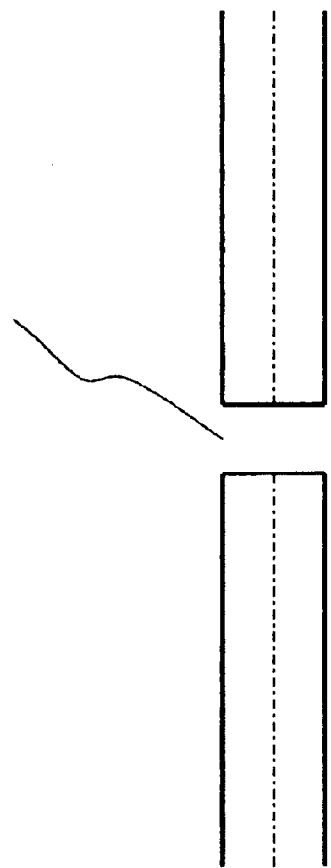
FIG. 26 is a drawing showing the state in which a gap is provided in an optical waveguide of the channel optical waveguide array.

In addition to using the above-described method of shifting the central axis of the optical waveguide as a method of providing a desired loss, there is a method of providing a gap at a position partway of the optical waveguide while maintaining the central axis at its original position as shown in FIG. 26. This method also makes it possible to achieve the desired loss $\alpha$(dB) obtained from Equation 6. The amount of gap for obtaining the desired loss $\alpha$(dB) is obtained by FIG. 27.

As for the portion of the m'th optical waveguide of the channel optical waveguide array where the gap is provided, such gap may be positioned anywhere along the m'th optical waveguide. In the method of shifting the central axis of the optical waveguide, two axial shift portions were needed, but in the method of providing a gap portion of the present embodiment, a gap portion may be provided at just one location. However, in the case where the desired loss $\alpha$(dB) is large, the loss $\alpha$(dB) may be secured by providing a plurality of gap portions.

Stray light is generated from the gap portion, and a design needs to be provided to prevent such stray light from being incident on the gap portion of another optical waveguide. In particular, the stray light is preferably prevented from approaching the center of the linear channel optical waveguide array. As for the portion where the gap is provided, for example, a gap portion is preferably provided at a location along either the line AB or the line CD positioned at 45 degrees with respect to the center line of FIG. 25, namely, the line AB or the line CD positioned 45 degrees left and right with respect to the center of the arc of the channel optical waveguide array 13.

It is possible to prevent stray light from being incident again by alternately arranging the position of the gap portion on the line AB and the line CD for adjacent optical waveguides. Namely, by arranging the gap portion of odd-numbered optical waveguides along the line AB, and the gap portion of even-numbered optical waveguides along the line CD, it is possible to prevent stray light from being incident again on adjacent optical waveguides.

Further, the desired loss $\alpha$(dB) may also be obtained by appropriately combining the method of shifting the central axis of the optical waveguide with the method of providing the optical waveguide with a gap.

Embodiment 5

In the first embodiment of the present invention, the method in which the waveguide length $\delta(m)$ is added to or subtracted from the m'th optical waveguide was described as a method of achieving the desired amount of phase adjustment.

Figure 28:
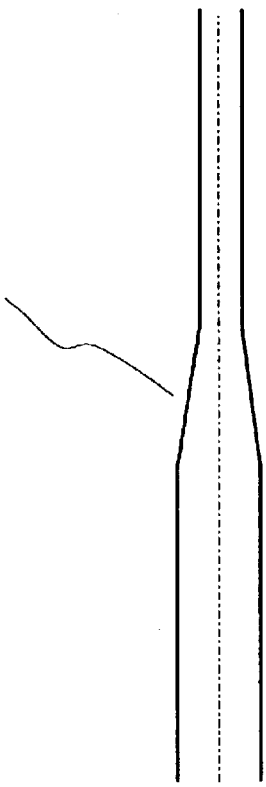
FIG. 28 is a drawing showing the state in which the core width is changed in an optical waveguide of the channel optical waveguide array.

As for another method of achieving the desired amount of phase adjustment, there is a method of increasing or decreasing the core width $2a$ ($\mu$m) of the channel optical waveguide array as shown in FIG. 28. In the case where the phase is delayed, the core width $2a$ ($\mu$m) is increased, and in the case where the phase is advanced, the core width $2a$ ($\mu$m) is decreased. The increase and decrease of the core width was determined using FIG. 29.

Figure 29:
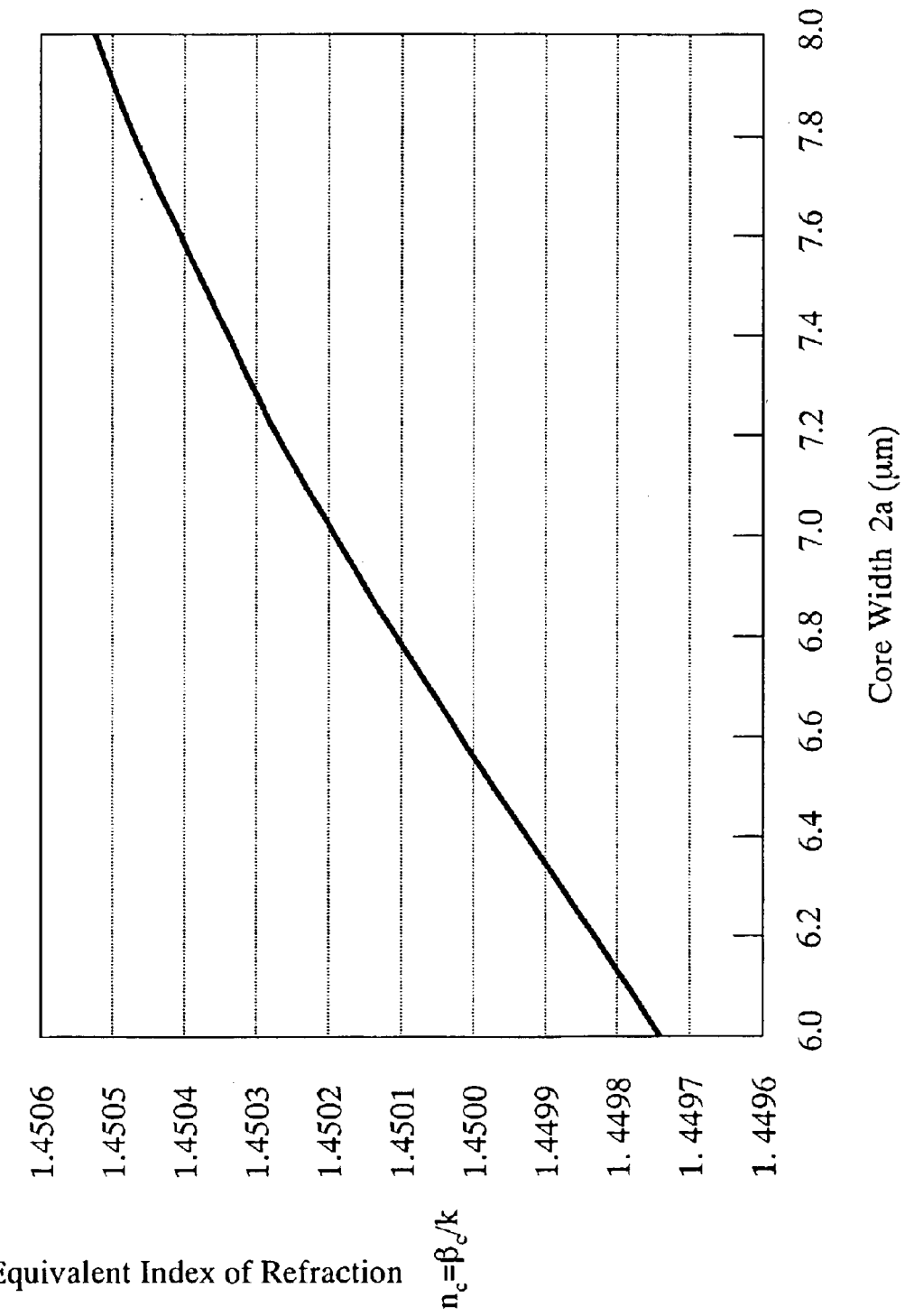
FIG. 29 is a drawing showing the calculation results of the relationship between the core width $2a$ ($\mu$m) of an optical waveguide of the channel optical waveguide array and the equivalent index of refraction $n_c=\beta_{c/k}$.

A description will now be given for the method of calculating the amount of increase and the amount of decrease of the core width from FIG. 29. In the case where a phase addition of p(rad) is required as the added phase quantity $\Theta(m)$, and the core width $2a$ ($\mu$m) of the m'th optical waveguide of the channel optical waveguide array has a length $L_{width}(m)$ (mm), then only the quantity $\epsilon_{width}(m)$ ($\mu$m) is added. At this time, $L_{width}(m)$ (mm) and $\epsilon_{width}(m)$ ($\mu$m) are determined to satisfy Equation 16 and Equation 17 given below.

$$\{n_c[2a+\epsilon_{width}(m)]-n_c(2a)\}L_{width}(m)=\lambda[\theta\text{goal}(m)-\theta\text{theory}(m)]/(2\pi) \quad \text{Equation 16}$$

$$\{n_c[2a+\epsilon_{width}(m)]-n_c(2a)\}L_{width}(m)=\lambda[\theta\text{goal}(m)-\theta\text{exper}(m)]/(2\pi) \quad \text{Equation 17}$$

In the method of achieving the required amount of phase adjustment by increasing or decreasing the core width, because a loss is generated at the portion where the core width changes, a design needs to be provided in which the loss due to the change of the core width is subtracted in advance from the amount of loss adjustment.

Embodiment 6

Figure 30:
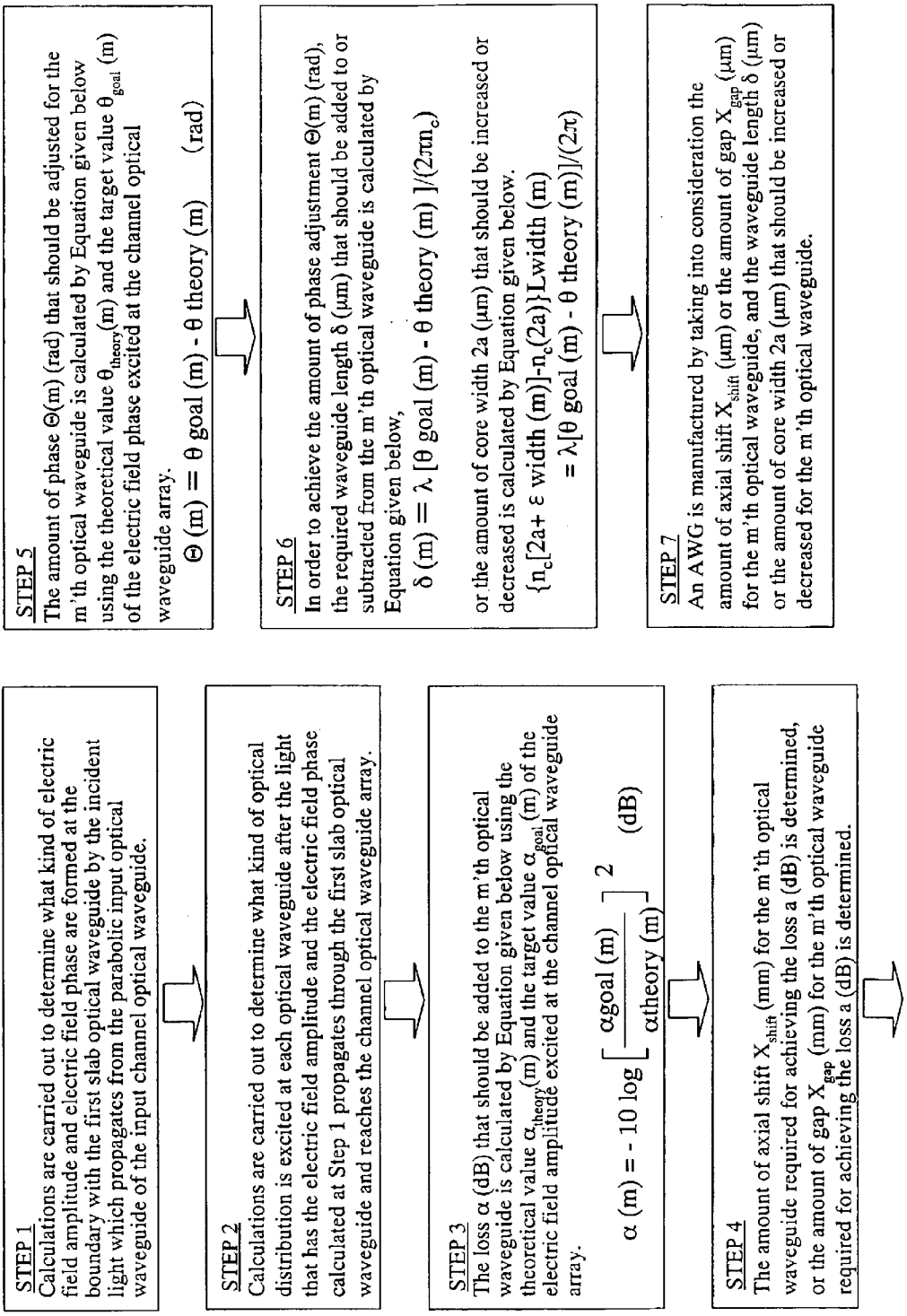
FIG. 30 is a drawing showing one embodiment of the manufacturing steps of the optical multiplexer of the present invention.

FIG. 30 is a flowchart showing the steps of the method of manufacturing the present invention. A description of such steps is given below.

Step 1

Calculations are carried out to determine what kind of electric field amplitude and electric field phase are formed at the boundary with the first slab optical waveguide by the incident light which propagates from the parabolic input optical waveguide of the input channel optical waveguide.

Step 2

Calculations are carried out to determine what kind of optical distribution is excited at each optical waveguide after the light that has the electric field amplitude and the electric field phase calculated at Step 1 propagates through the first slab optical waveguide and reaches the channel optical waveguide array.

Step 3

The loss α(dB) that should be added to the m'th optical waveguide is calculated by Equation 6 given below using the theoretical value $\alpha_{theory}(m)$ and the target value $\alpha_{goal}(m)$ of the electric field amplitude excited at the channel optical waveguide array.

$$\alpha(m) = -10 \log\left[\frac{\alpha\text{goal}(m)}{\alpha\text{theory}(m)}\right]^2 (dB) \qquad \text{Equation 6}$$

Step 4

Figure 27:
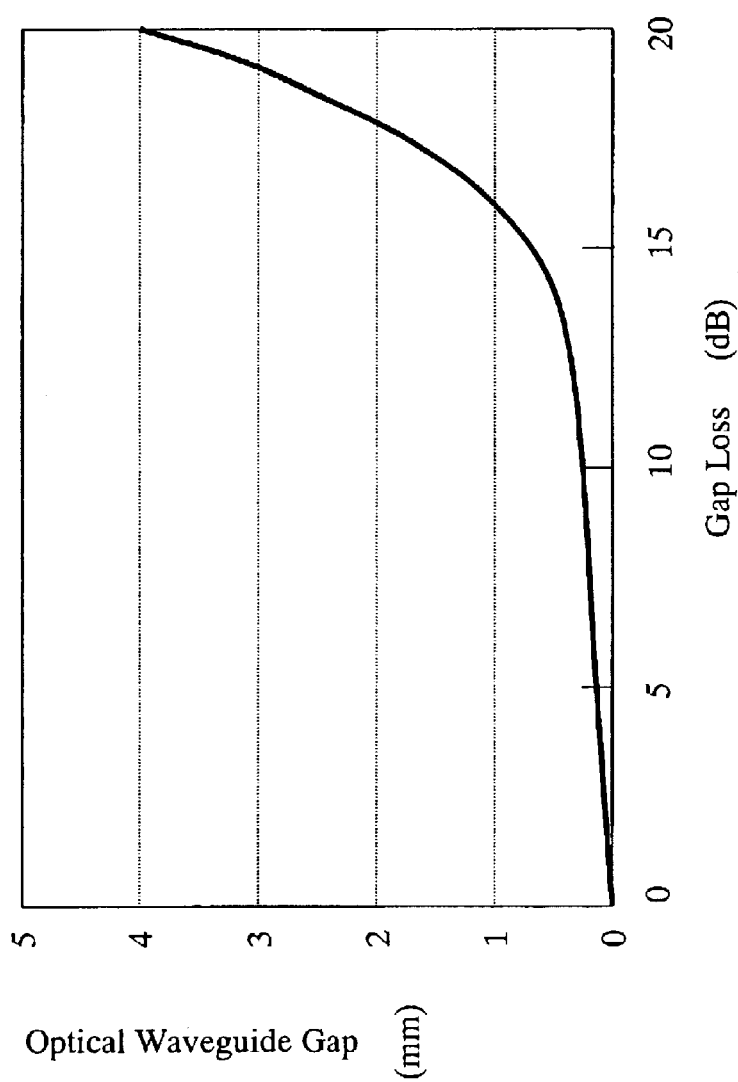
FIG. 27 is a drawing showing the experimentally determined gap $X_{gap}(mm)$ required in order to obtain the desired loss α(dB) when providing the gap of the optical waveguide.

The amount of axial shift $X_{shift}(\mu m)$ for the m'th optical waveguide required for achieving the loss α(dB) is determined using FIG. 23, or the amount of gap $X_{gap}(\mu m)$ for the m'th optical waveguide required for achieving the loss α(dB) is determined using FIG. 27.

Step 5

The amount of phase Θ(m) (rad) that should be adjusted for the m'th optical waveguide is calculated by Equation 18 given below using the theoretical value $\theta_{theory}(m)$ and the target value $\theta_{goal}(m)$ of the electric field phase excited at the channel optical waveguide array.

$$\Theta(m) = \theta\text{goal}(m) - \theta\text{theory}(m) \qquad \text{Equation 18}$$

Step 6

In order to achieve the amount of phase adjustment Θ(m) (rad), the required waveguide length δ(μm) that should be added to or subtracted from the m'th optical waveguide is calculated by Equation 10 given below, or the amount of core width 2a (μm) that should be increased or decreased is calculated by Equation 16 given below.

$$\delta(m) = \lambda[\theta\text{goal}(m) - \theta\text{theory}(m)]/(2\pi n_c) \qquad \text{Equation 10}$$

$$\{n_c[2a + \epsilon_{width}(m)] - n_c(2a)\}L_{width}(m) = \lambda[\theta\text{goal}(m) - \theta\text{theory}(m)]/(2\pi) \qquad \text{Equation 16}$$

Step 7

An AWG is manufactured by taking into consideration the amount of axial shift $X_{shift}(\mu m)$ or the amount of gap $X_{gap}(\mu m)$ for the m'th optical waveguide, and the waveguide length δ(μm) or the amount of core width 2a (μm) that should be increased or decreased for the m'th optical waveguide.

In this regard, the manufacturing method preferably includes all of Step 1 through Step 7, but it is also possible to use a manufacturing method in which only the phase is adjusted by omitting Step 3 and Step 4, whereby it is possible to sufficiently reduce the dispersion in comparison with a prior art AWG.

In the present embodiment, it is possible to reduce the dispersion of the AWG by adjusting the loss and phase of the arrayed optical waveguides using the theoretical electric field phase and electric field amplitude.

Embodiment 7

Figure 31:
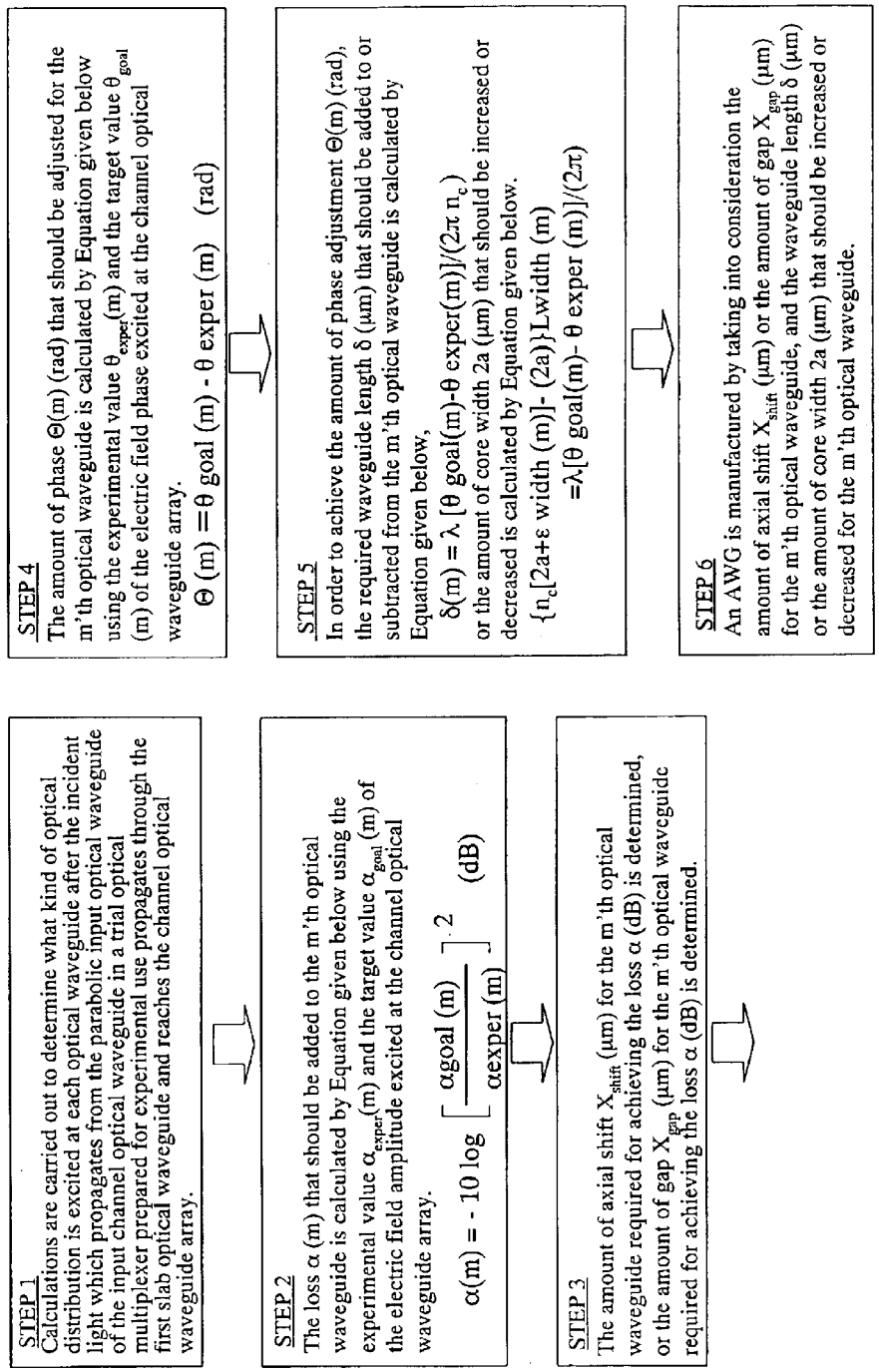
FIG. 31 is a drawing showing another embodiment of the manufacturing steps of the optical mult/demultiplexer of the present invention.

FIG. 31 is a flowchart showing the steps of another method of manufacturing the present invention. A description of such steps is given below.

Step 1

Calculations are carried out to determine what kind of optical distribution is excited at each optical waveguide after the incident light which propagates from the parabolic input optical waveguide of the input channel optical waveguide in a trial optical multiplexer prepared for experimental use propagates through the first slab optical waveguide and reaches the channel optical waveguide array.

Step 2

The loss α(m) that should be added to the m'th optical waveguide is calculated by Equation 11 given below using the experimental value $\alpha_{exper}(m)$ and the target value $\alpha_{goal}(m)$ of the electric field amplitude excited at the channel optical waveguide array.

$$\alpha(m) = -10 \log\left[\frac{\alpha\text{goal}(m)}{\alpha\text{exper}(m)}\right]^2 (dB) \qquad \text{Equation 11}$$

Step 3

The amount of axial shift $X_{shift}(\mu m)$ for the m'th optical waveguide required for achieving the loss α(dB) is determined using FIG. 23, or the amount of gap $X_{gap}(\mu m)$ for the m'th optical waveguide required for achieving the loss α(dB) is determined using FIG. 27.

Step 4

The amount of phase Θ(m) (rad) that should be adjusted for the m'th optical waveguide is calculated by Equation 19 given below using the experimental value $\theta_{exper}(m)$ and the target value $\theta_{goal}(m)$ of the electric field phase excited at the channel optical waveguide array.

$$\Theta(m) = \theta\text{goal}(m) - \theta\text{exper}(m) \qquad \text{Equation 19}$$

Step 5

In order to achieve the amount of phase adjustment Θ(m) (rad), the required waveguide length δ(μm) that should be added to or subtracted from the m'th optical waveguide is calculated by Equation 15 given below, or the amount of core width 2a (μm) that should be increased or decreased is calculated by Equation 17 given below.

$$\delta(m) = \lambda[\theta\text{goal}(m) - \theta\text{exper}(m)]/(2\pi n_c) \qquad \text{Equation 15}$$

$$\{n_c[2a + \epsilon_{width}(m)] - n_c(2a)\}L_{width}(m) = \lambda[\theta\text{goal}(m) - \theta\text{exper}(m)]/(2\pi) \qquad \text{Equation 17}$$

Step 6

An AWG is manufactured by taking into consideration the amount of axial shift $X_{shift}(\mu m)$ or the amount of gap $X_{gap}(\mu m)$ for the m'th optical waveguide, and the waveguide length δ(μm) or the amount of core width 2a (μm) that should be increased or decreased for the m'th optical waveguide.

In this regard, the manufacturing method preferably includes all of Step 1 through Step 6, but it is also possible to use a manufacturing method in which only the phase is adjusted by omitting Step 2 and Step 3, whereby it is possible to sufficiently reduce the dispersion in comparison with a prior art AWG.

In the present embodiment, it is possible to reduce the dispersion of the AWG by adjusting the loss and phase of the arrayed optical waveguides using the experimental electric field phase and electric field amplitude.

Embodiment 8

The optical multiplexer of the present invention was manufactured using silica optical waveguide manufacturing technology. First, a SiO$_2$ lower clad layer was deposited onto a Si substrate using a flame hydrolysis deposition method, and then after depositing a core layer of SiO$_2$ glass with GeO$_2$ added as a dopant, a transparent glass is formed by an electric furnace.

Figure 32:
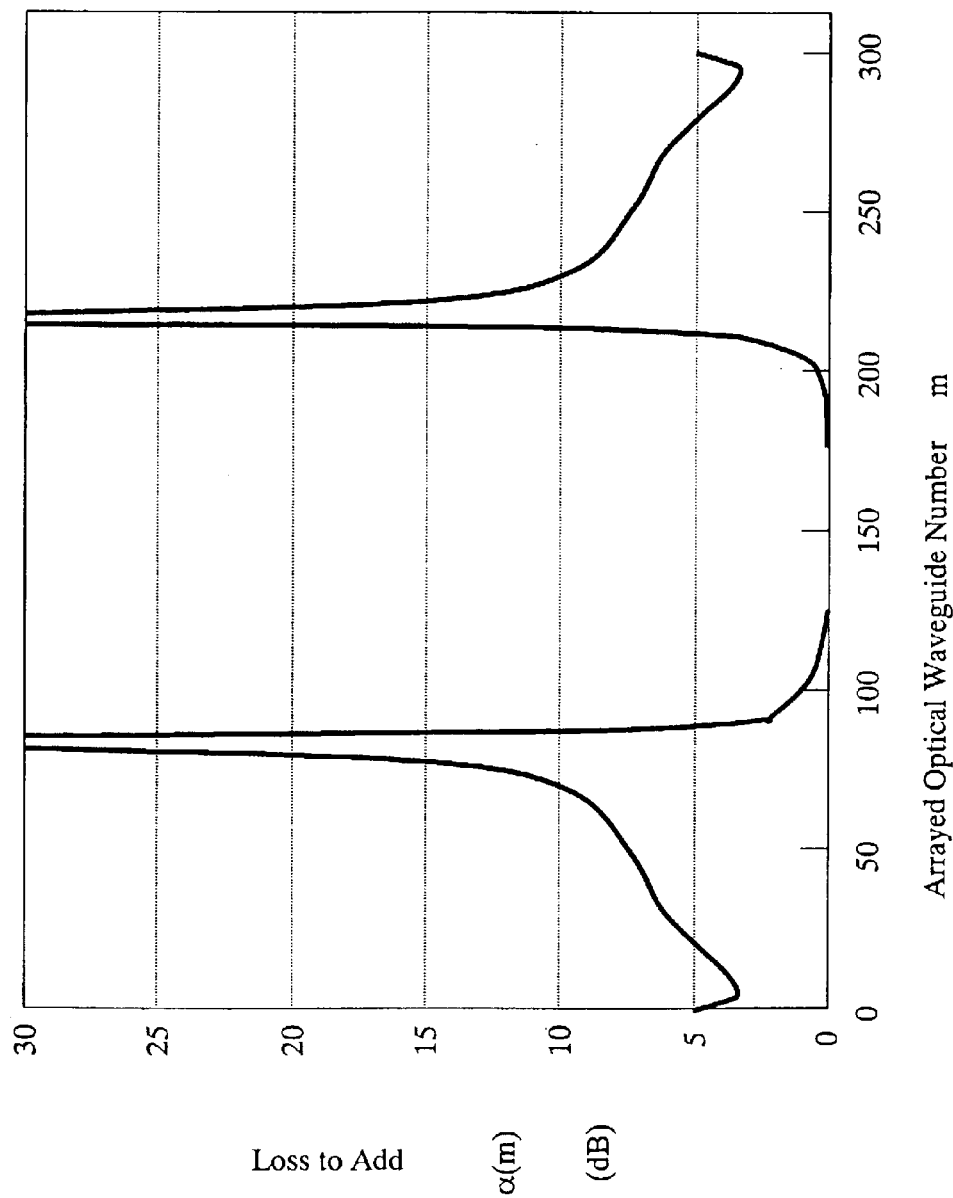
FIG. 32 is a drawing showing loss to add for the m'th optical waveguide.
Figure 33:
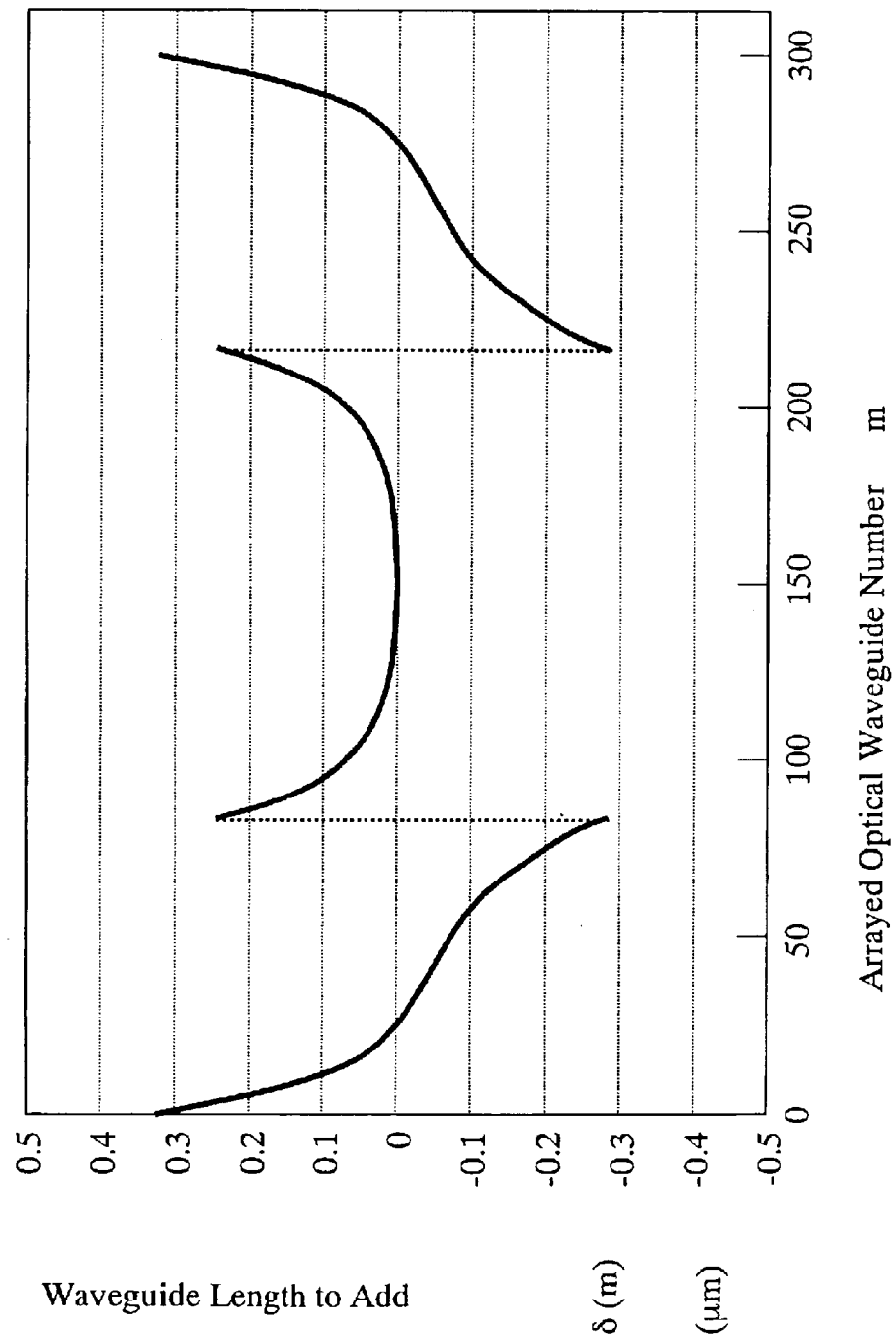
FIG. 33 is a drawing showing waveguide length to add for the m'th optical waveguide.

FIG. 32 and FIG. 33 respectively show the loss to add $\alpha(m)$ and the waveguide length to add $\delta(m)$ for the m'th optical waveguide determined in accordance with the steps of FIG. 30. As for the loss to add $\alpha(m)$, the ratio of theoretical electric field amplitude and the target electric field amplitude of FIG. 21 was calculated, and this was converted to dB. As for the waveguide length to add $\delta(m)$, the difference between the theoretical electric field phase and the target electric field phase of FIG. 24 was calculated, and because this was converted to a waveguide length using the index of refraction and the operating wavelength of the optical waveguide, a positive value means that the optical waveguide is made longer, and a negative value means that the optical waveguide is shortened. In FIG. 32 and FIG. 33, both $\alpha(m)$ and $\delta(m)$ have two point where the graph is discontinuous, and in this regard, the loss to add $\alpha(m)$ becomes infinite, and the waveguide length to add $\delta(m)$ becomes discontinuous. In this case, when the loss is infinite, such optical waveguide may be eliminated at the beginning, and as for the waveguide length to add $\delta(m)$ for both optical waveguides adjacent to the eliminated optical waveguide, the waveguide adjustment direction is changed from adding to shortening or from shortening to adding.

Further, the provision of the specific loss addition is achieved by providing a prescribed amount of axial shift partway of the optical waveguide from the relationship between the loss to add $\alpha(m)$ and the amount of axial shift $X_{shift}(m)$ using FIG. 23.

Figure 34:
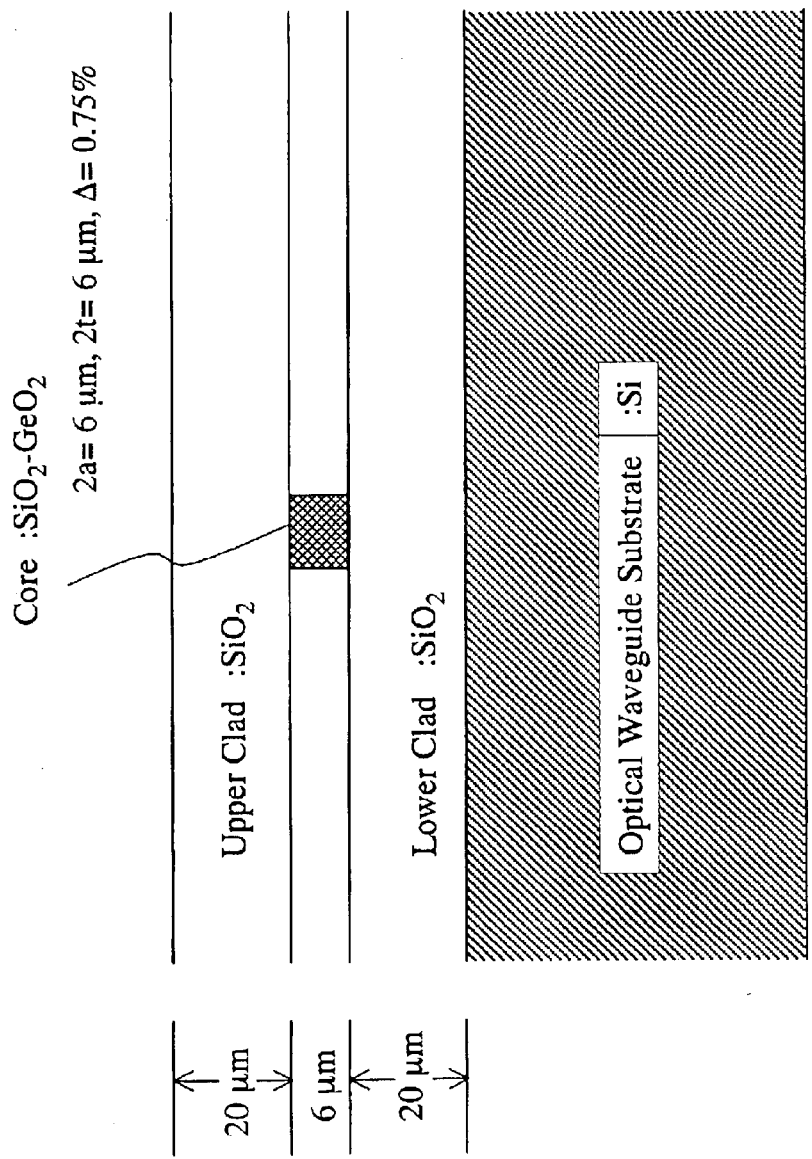
FIG. 34 is a cross-sectional drawing showing a portion of one optical waveguide.

A mask pattern was created taking into consideration the amount of axial shift $X_{shift}(m)$ and the waveguide length to add $\delta(m)$ determined as described above. Using the mask pattern created in this way, etching was carried out on the core layer to form an optical waveguide portion, and then a deposition was carried out again to deposit a SiO$_2$ upper clad layer. FIG. 34 shows a cross-sectional view of a portion of one optical waveguide. The optical waveguide used here has a core width $2a=6.0$ $\mu$m, a core thickness $2t=6.0$ $\mu$m, and a refractive index difference $\Delta=0.75\%$.

Figure 35:
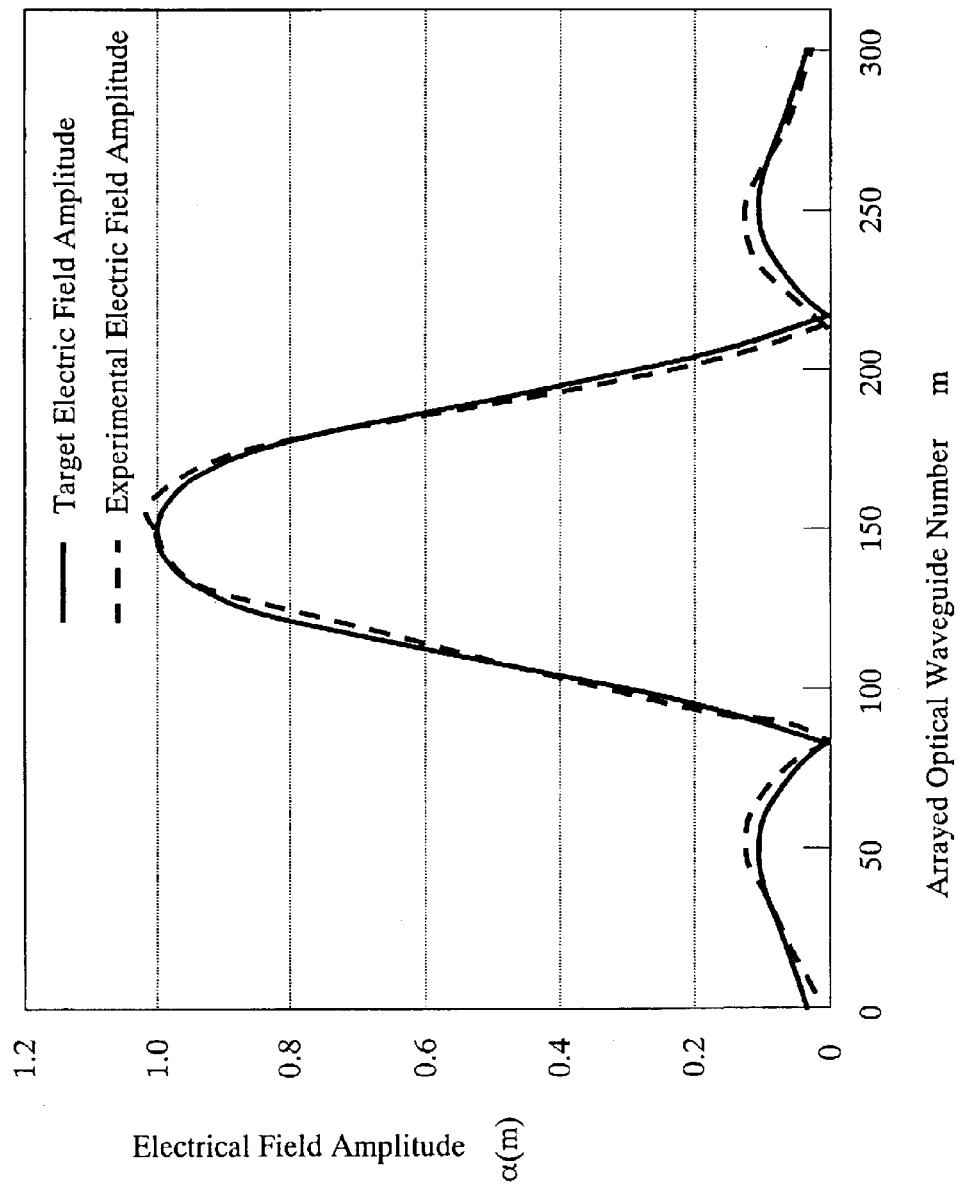
FIG. 35 is a drawing showing the target electric field amplitude and the experimental electric field amplitude of the AWG of the present invention.
Figure 36:
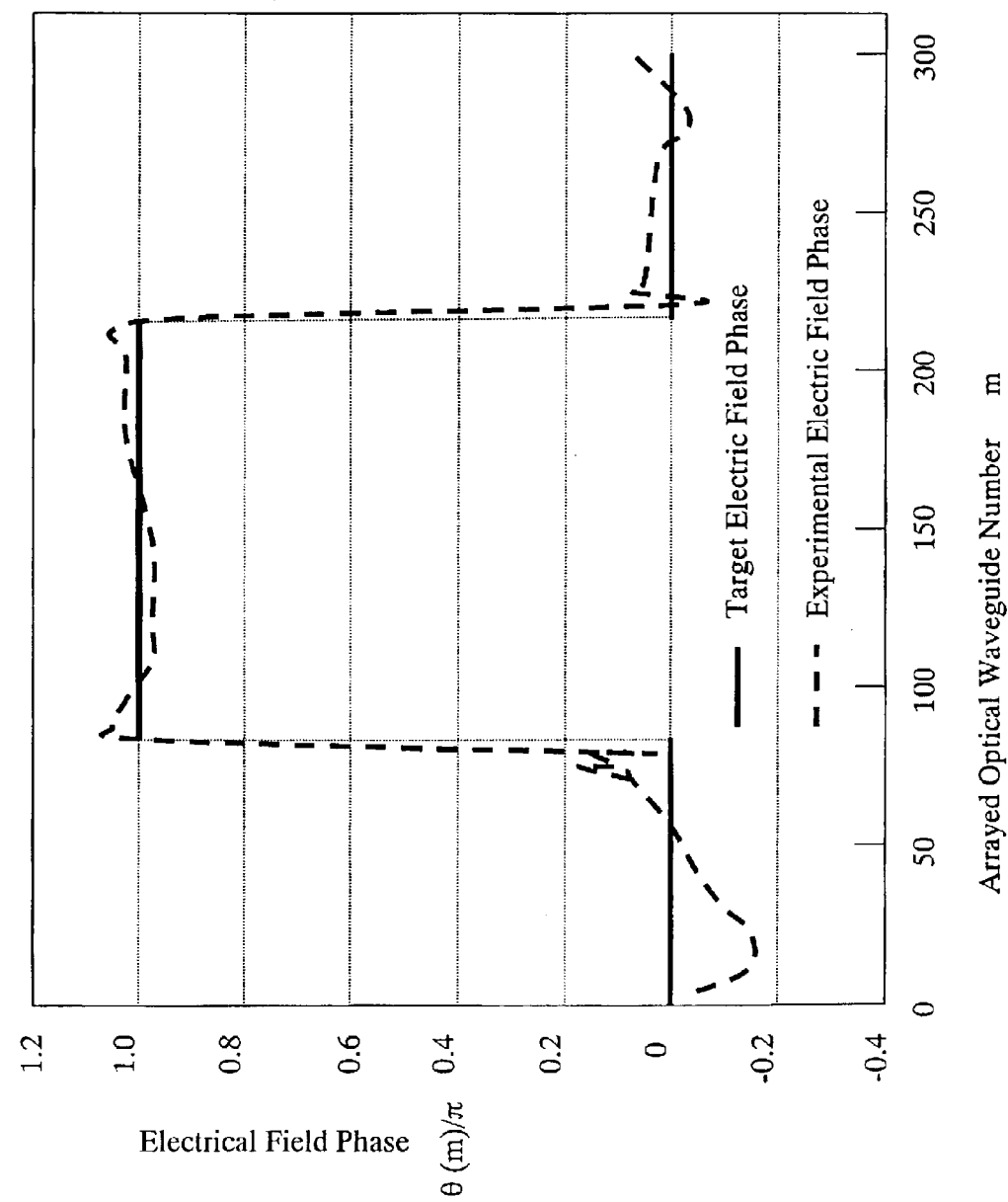
FIG. 36 is a drawing showing the target electric field phase and the experimental electric field phase of the AWG of the present invention.

In the present embodiment, an AWG having a channel space S=100 GHz was designed. For the AWG of the present invention manufactured in this way, the target electric field amplitude $\alpha(m)$ and the experimental electric field amplitude $\alpha(m)$ are shown in FIG. 35, and the target electric field phase $\delta(m)$ and the experimental electric field phase $\delta(m)$ are shown in FIG. 36. From FIG. 35 and FIG. 36, it was confirmed that the theoretical value and the experimental value had a good match for both the electric field amplitude $\alpha(m)$ and the electric field phase $\delta(m)$.

Figure 37:
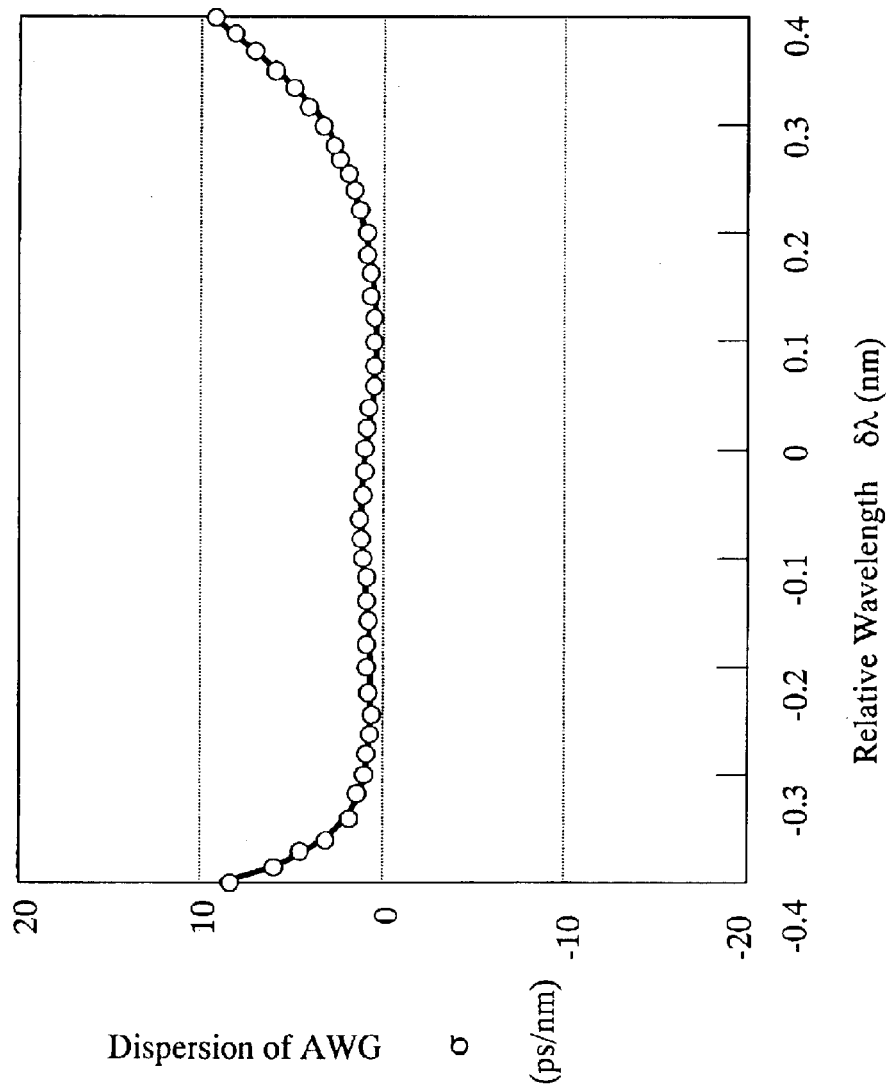
FIG. 37 is a drawing showing the experimental results of the dispersion characteristics of the AWG of the present invention.

Next, FIG. 37 shows the experimental results of the dispersion characteristics of the AWG of the present invention. FIG. 37 shows that the dispersion of the AWG of the present invention is roughly zero, and from a comparison with the experimental value of FIG. 17 showing the dispersion of a prior art AWG, it is understood that the dispersion is sharply reduced.

Embodiment 9

Next, a description will be given for an embodiment for an AWG having a channel space S=50 GHz. As for the parameters of the AWG described in the present embodiment, the waveguide space of the input channel optical waveguide in the first slab optical waveguide and output channel optical waveguide in the second slab optical waveguide is D=25 $\mu$m, the waveguide space of the arrayed optical waveguides in the first slab optical waveguide and the arrayed optical waveguides in the second slab optical waveguide is d=20 $\mu$m, the radius of curvature of the first and second slab optical waveguides is f=30.24 mm, the waveguide length of adjacent arrayed optical waveguides of the channel optical waveguide array is $\Delta M=63$ $\mu$m, the number of optical waveguides of the channel optical waveguide array is N=300, the number of channels of the multiplexer is $N_{ch}=64$, the channel space of the multiplexer is S=50 GHz, and the central channel wavelength is $\lambda_{center}=1.55$ $\mu$m. Further, the length of the parabolic input optical waveguide is l=400 $\mu$m, and the width of the parabolic shape is w=23 $\mu$m.

Figure 38:
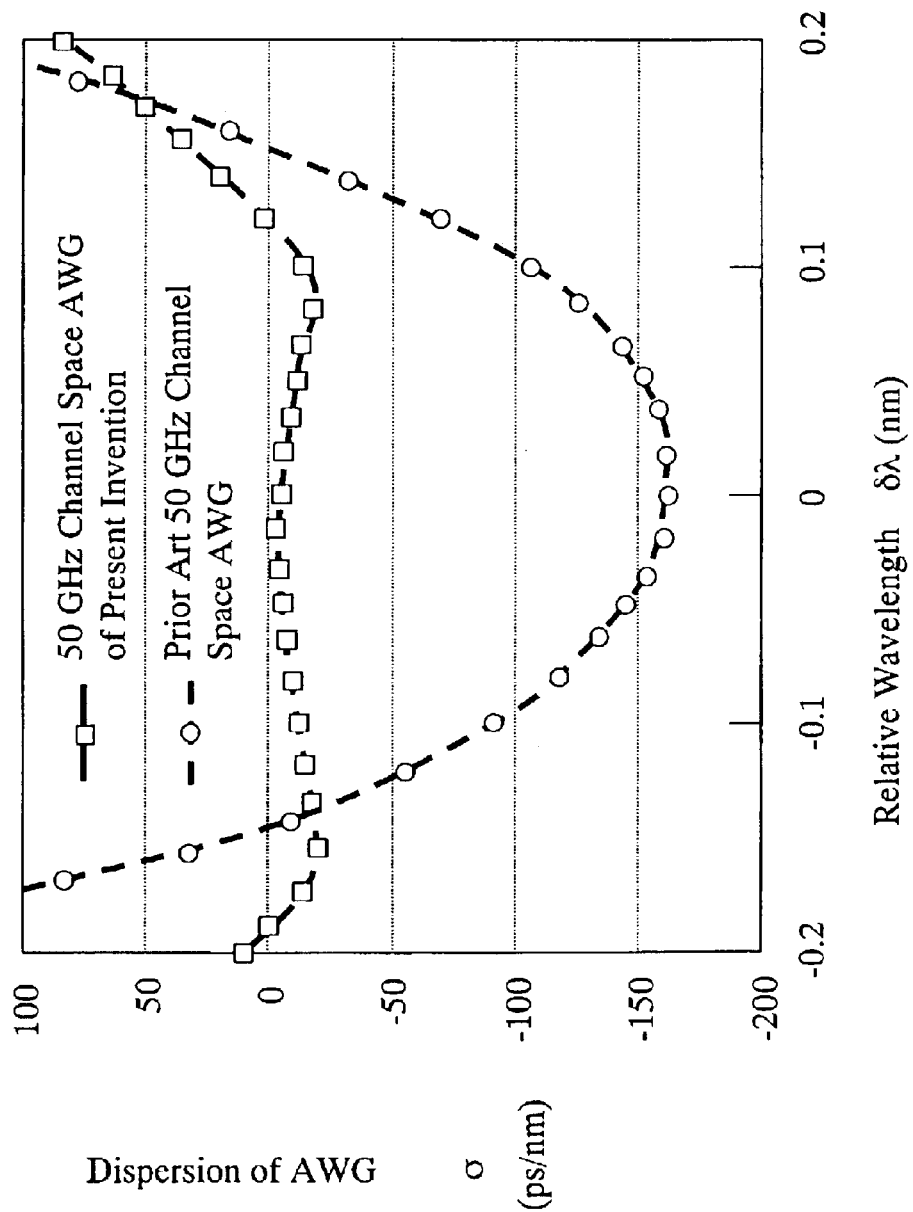
FIG. 38 is a drawing showing a comparison of the experimental results of the dispersion characteristics of a prior art AWG and the AWG of the present invention.

In the same manner as that of Embodiment 8, the amount of axial shift $X_{shift}(m)$ for the m'th optical waveguide and the waveguide length $\delta(m)$ increased or decreased for the m'th optical waveguide are determined in accordance with the steps of FIG. 30. FIG. 38 shows the experimental results of the dispersion characteristics of the AWG of the present embodiment. The dispersion of the AWG of the present invention is approximately $\sigma=-15$ ps/nm, and compared with the prior art AWG which has a dispersion $\sigma=-160$ ps/nm, it is understood that the present invention makes it possible to sharply reduce the dispersion of the AWG. When the dispersion of the AWG is reduced to this level, sufficient characteristics are provided for an optical communication system having a transmission speed B=10 Gbps.

Embodiment 10

Figure 1:
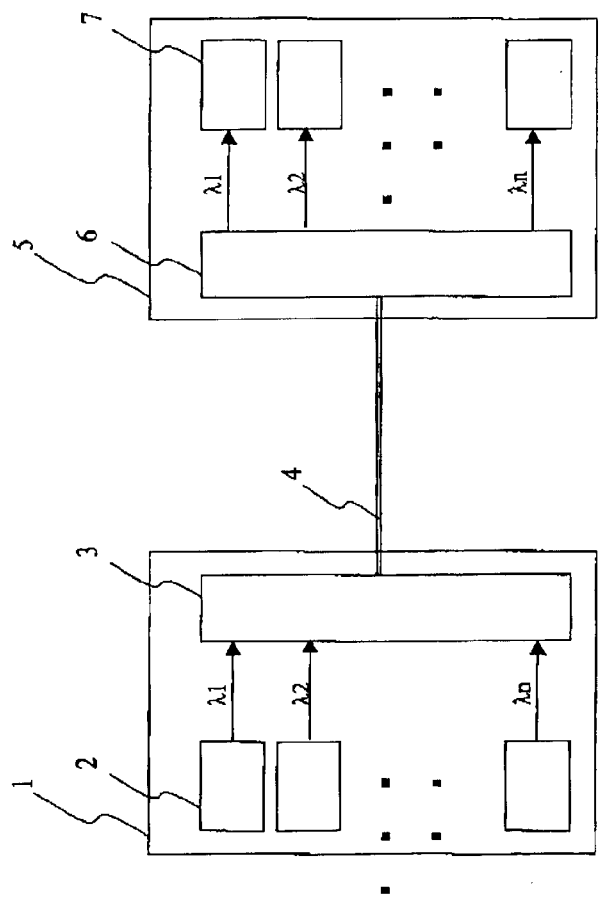
FIG. 1 is a drawing showing the structure of a WDM optical communication system.
Figure 2:
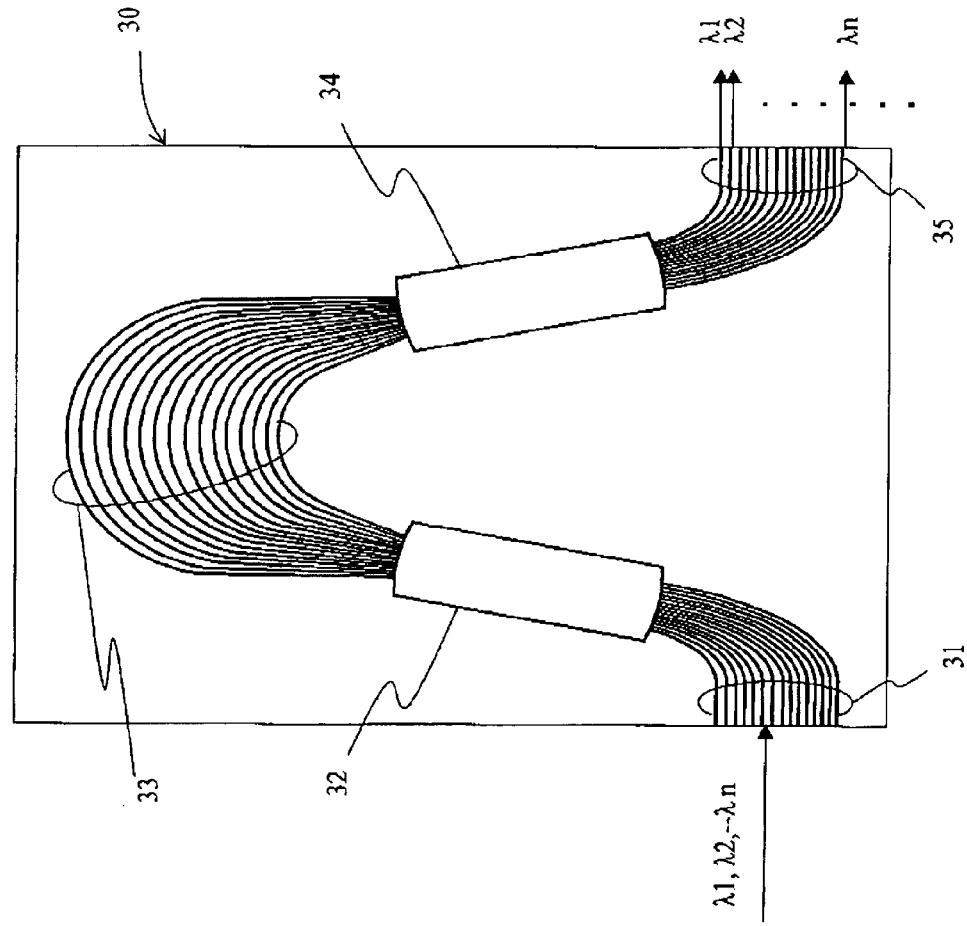
FIG. 2 is a drawing showing a prior art arrayed lattice-type optical multiplexer.
Figure 3:
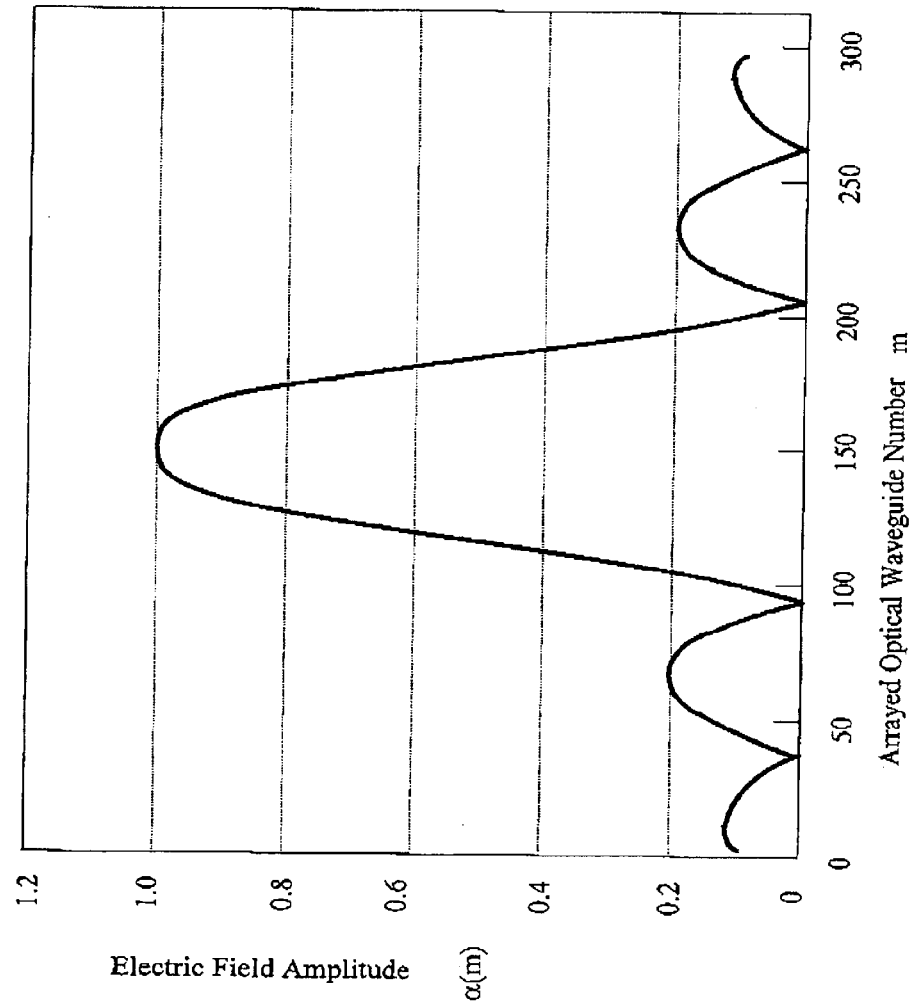
FIG. 3 is a drawing showing the electric field amplitude at the boundary between the channel optical waveguide array and the second slab optical waveguide which is required in order to achieve a flat demultiplexing spectrum.

In the optical communication system shown in FIG. 1, when the optical multiplexer described in Embodiment 9 is combined with the optical transmitter 11 and the optical receiver 15, it is possible to obtain an optical communication system in which the central channel wavelength is $\lambda_{center}=1.55$ $\mu$m, the number of channels of the multiplexer is $N_{ch}=64$, the channel space of the multiplexer is S=50 GHz, and the transmission speed is B=10 Gbps. When this optical transmitter and optical receiver are combined, the total capacity becomes 10 Gbps$\times$64=640 Gbps.

As described above, in accordance with the optical multiplexer and the manufacturing method thereof of the present invention, by adjusting the loss and phase of the optical waveguides of the channel optical waveguide array, it is possible to reduce the dispersion of the AWG, and this makes it possible to construct a large-capacity WDM optical communication system.

What is claimed is:

1. An optical multiplexer, comprising:

at least one input channel optical waveguide, a first slab optical waveguide, a channel optical waveguide array formed from a plurality of optical waveguides having a prescribed waveguide length, a second slab optical waveguide and at least one output channel optical waveguide sequentially connected in a tandem arrangement on an optical waveguide substrate; and phase adjustment means in an m'th optical waveguide of said channel optical waveguide array based on an amount of phase adjustment $\Theta(m)$ which is defined to be the difference between a target electric field phase $\theta_{goal}(m)$ excited at the m'th optical waveguide of said channel optical waveguide array by propagating light incident on said input channel optical waveguide which achieves desired demultiplexing characteristics, and a theoretical electric field phase $\theta_{theory}(m)$ excited at the m'th optical waveguide of said channel optical waveguide array by the propagating light incident on said input channel optical waveguide before phase adjustment, wherein $\Theta(m)=\theta_{goal}(m)-\theta_{theory}(m)$.

2. An optical multiplexer, comprising:

at least one input channel optical waveguide, a first slab optical waveguide, a channel optical waveguide array formed from a plurality of optical waveguides having a prescribed waveguide length, a second slab optical waveguide and at least one output channel optical waveguide sequentially connected in a tandem arrangement on an optical waveguide substrate; and phase adjustment means in an m'th optical waveguide of said channel optical waveguide array based on an amount of phase adjustment $\Theta(m)$ which is defined to be the difference between a target electric field phase $\theta_{goal}(m)$ excited at the m'th optical waveguide of said channel optical waveguide array by propagating light incident on said input channel optical waveguide which achieves desired demultiplexing characteristics, and an experimental electric field phase $\theta_{exper}(m)$ excited at the m'th optical waveguide of said channel optical waveguide array by the propagating light incident on said input channel optical waveguide before phase adjustment, wherein $\Theta(m)=\theta_{goal}(m)-\theta_{exper}(m)$.

3. The optical multiplexer of claim 1 or 2, further comprising a loss adjustment means for achieving a sinc function type electric field intensity at the optical waveguides of said channel optical waveguide array.

4. The optical multiplexer of claim 3 wherein said loss adjustment means shifts the axis on the optical waveguides of said channel optical waveguide array.

5. The optical multiplexer of claim 3 wherein said loss adjustment means provides a gap in the optical waveguides of said channel optical waveguide array.

6. The optical multiplexer of claim 3 wherein the loss adjustment means eliminates or shuts off one or more prescribed optical waveguides of said channel optical waveguide array.

7. The optical multiplexer of claim 1 or 2, further comprising loss adjustment means which, supplies the m'th optical waveguide of said channel optical waveguide may with an amount of loss adjustment $A(m)$ which is defined to be the difference between a target electric field amplitude $\alpha_{goal}(m)$ excited at the m'th optical waveguide of said channel optical waveguide array by the propagating light incident on said input channel optical waveguide achieves desired demultiplexing characteristics, and a theoretical electric field amplitude $\alpha_{theory}(m)$ excited at the m'th optical waveguide of said channel optical waveguide array by the propagating light incident on said input channel optical waveguide before loss adjustment, wherein $A(m)=-10\times\log[\alpha_{goal}(m)/\alpha_{theory}(m)]$(dB).

8. The optical multiplexer of claim 7 wherein said loss adjustment means shifts the axis at the optical waveguides of said channel optical waveguide array.

9. The optical multiplexer of claim 7 wherein said loss adjustment means provides a gap in the optical waveguides of said channel optical waveguide array.

10. The optical multiplexer of claim 7, wherein the adjustment means eliminates or shuts off one or more prescribed optical waveguides of said optical waveguide array.

11. The optical multiplexer of claim 1 or 2, further comprising loss adjustment means which supplies the m'th optical waveguide of said channel optical waveguide array with an amount of loss adjustment $A(m)$ which is defined to be the difference between a target electric field amplitude $\alpha_{goal}(m)$ excited at the m'th optical waveguide of said channel optical waveguide array by the propagating light incident on said input channel optical waveguide which achieves desired demultiplexing characteristics, and an experimental electric field amplitude $\alpha_{exper}(m)$ excited at the m'th optical waveguide of said channel optical waveguide array by the propagating light incident on said input channel optical waveguide before loss adjustment, wherein $A(m)=-10\times\log[\alpha_{goal}(m)/\alpha_{exper}(m)]$(dB).

12. The optical multiplexer of claim 11 wherein said loss adjustment means shifts the axis at the optical waveguides of said channel optical waveguide array.

13. The optical multiplexer of claim 11 wherein said loss adjustment means provides a gap in the optical waveguides of said channel optical waveguide array.

14. The optical multiplexer of claim 11, wherein the loss adjustment means eliminates or shuts off one or more prescribed optical waveguides of said optical waveguide array.

15. The optical multiplexer of claim 1 or 2, wherein the core of said input channel optical waveguide near the boundary with said first slab optical waveguide has a parabolic shape.

16. The optical multiplexer of claim 1 or 2, wherein the core of said input channel optical waveguide near the boundary with said first slab optical waveguide has a tapered shape.

17. The optical multiplexer of claim 1 or 2, wherein said phase adjustment means increases or decreases the waveguide length of said channel optical waveguide array.

18. The optical multiplexer of claim 1 or 2, wherein said phase adjustment means increases or decreases the waveguide core width of said channel optical waveguide array.

19. An optical transmitter or optical receiver equipped with the optical multiplexer described in claim 1 or 2.

20. A method of producing an optical multiplexer comprising:

at least one input channel optical waveguide, a first slab optical waveguide, a channel optical waveguide array formed from a plurality of optical waveguides having a prescribed waveguide length, a second slab optical waveguide and at least one output channel optical waveguide sequentially connected in a tandem arrangement on an optical waveguide substrate; and phase adjustment means in an m'th optical waveguide of said channel optical waveguide array based on an amount of phase adjustment $\Theta(m)$ which is defined to be the difference between a theoretical electric field phase $\theta_{theory}(m)$ excited at the m'th optical waveguide of said channel optical waveguide array before phase adjustment by light having a theoretical electric field phase whose value is obtained by calculating the electric field phase excited at the boundary with a first fan-shaped slab region by propagating light incident on said input channel optical waveguide, and a target electric field phase $\theta_{goal}(m)$ excited at the m'th optical waveguide of said channel optic waveguide array by the propagating light incident on said input channel optical waveguide which achieves desired demultiplexing characteristics, wherein $\Theta(m)=\theta_{goal}(m)-\theta_{theory}(m)$.

21. A method of producing an optical multiplexer comprising:

at least one input channel optical waveguide, a first slab optical waveguide, a channel optical waveguide array formed from a plurality of optical waveguides having a prescribed waveguide length, a second slab optical waveguide and at least one output channel optical waveguide sequentially connected in a tandem arrangement on an optical waveguide substrate; and phase adjustment means in an m'th optical waveguide of said channel optical waveguide array based on an amount of phase adjustment $\Theta(m)$ which is define to be the difference between an experimental electric field phase $\theta_{exper}(m)$ excited at the m'th optical waveguide of said channel optical waveguide array before phase adjustment by light having an experimental electric field phase whose value is obtained by measuring the electric field phase excited at the boundary with a first fan-shaped slab region by propagating light incident on said input channel optical waveguide, and a target electric field phase $\theta_{goal}(m)$ excited at the m'th optical waveguide of said channel optical waveguide array by the propagating light incident on said input channel optical waveguide which desired demultiplexing characteristics, wherein $\Theta(m)=\theta_{goal}(m)-\theta_{exper}(m)$.

22. The method of producing an optical multiplexer of claim 20 or claim 21, further comprising loss adjustment means which supplies the m'th optical waveguide of said channel optical waveguide array with an amount of loss adjustment $A(m)$ which is defined to be the difference between a theoretical electric field amplitude $\alpha_{theory}(m)$ excited at the m'th optical waveguide of said channel optical waveguide array before loss adjustment by light having a theoretical electric field phase whose value is obtained by calculating the electric field phase excited at the boundary with a first fan-shaped slab region by propagating light incident on said input channel optical waveguide, and a target electric field amplitude $\alpha_{goal}(m)$ excited at the m'th optical waveguide of said channel optical waveguide array by the propagating light incident on said input channel optical waveguide achieves desired demultiplexing characteristics, wherein $A(m)=-10\times\log[\alpha_{goal}(m)/\alpha_{theory}(m)]$(dB).

23. The method of producing an optical multiplexer of claim 20 or claim 21, further comprising loss adjustment means which supplies the m'th optical waveguide of said channel optical waveguide array with an amount of loss adjustment $A(m)$ which is defined to be the difference between an experimental electric field amplitude $\alpha_{exper}(m)$ excited at the m'th optical waveguide of said channel optical waveguide array before loss adjustment by light having an experimental electric field phase whose value is obtained by measuring the electric field phase excited at the boundary with a first fan-shaped slab region by the propagating light incident on said input channel optical waveguide, and a target electric field amplitude $\alpha_{goal}(m)$ excited at the m'th optical waveguide of said channel optical waveguide array by the propagating light incident on said input channel optical waveguide which achieves desired demultiplexing characteristics, wherein $A(m)=-10\times\log[\alpha_{goal}(m)/\alpha_{exper}(m)]$ (dB).

* * * * *